(12) United States Patent
Sakai et al.

(10) Patent No.: US 7,684,894 B2
(45) Date of Patent: Mar. 23, 2010

(54) AUTONOMOUSLY MOVING ROBOT

(75) Inventors: Tatsuo Sakai, Suita (JP); Tomoharu Nakahara, Nishinomiya (JP); Hitoshi Kitano, Takarazuka (JP); Yukihiko Kitano, Nishinomiya (JP); Tsuyoshi Yamane, Hirakata (JP); Hiroyuki Fujii, Higashiosaka (JP)

(73) Assignee: Panasonic Electric Works Co., Ltd., Osaka (JP)

( * ) Notice: Subject to any disclaimer, the term of this patent is extended or adjusted under 35 U.S.C. 154(b) by 1068 days.

(21) Appl. No.: 10/549,110

(22) PCT Filed: Mar. 12, 2004

(86) PCT No.: PCT/JP2004/003355

§ 371 (c)(1),
(2), (4) Date: Feb. 14, 2006

(87) PCT Pub. No.: WO2004/081683

PCT Pub. Date: Sep. 23, 2004

(65) Prior Publication Data

US 2006/0184274 A1 Aug. 17, 2006

(30) Foreign Application Priority Data

Mar. 14, 2003 (JP) ............................. 2003-070728

(51) Int. Cl.
*G06F 19/00* (2006.01)
(52) U.S. Cl. .................................................... 700/245
(58) Field of Classification Search ......... 700/245–247, 700/255, 257–259; 701/300–302, 200, 209–210
See application file for complete search history.

(56) References Cited

U.S. PATENT DOCUMENTS

| 5,475,494 | A |   | 12/1995 | Nishida et al. |
| 5,525,882 | A |   | 6/1996 | Asaka et al. |
| 6,151,539 | A | * | 11/2000 | Bergholz et al. ............... 701/25 |
| 6,456,728 | B1 | * | 9/2002 | Doi et al. ..................... 382/103 |

(Continued)

FOREIGN PATENT DOCUMENTS

JP          63-124114         5/1988

(Continued)

OTHER PUBLICATIONS

English Language Abstract of JP 2000-123298.

(Continued)

*Primary Examiner*—Kim T Nguyen
(74) *Attorney, Agent, or Firm*—Greenblum & Bernstein, P.L.C.

(57) ABSTRACT

An autonomously moving robot that drives while evading an obstacle by an environment information acquisitioner. The information acquisitioner includes an imager that takes an image of a circumference on a driving route, an image recognition processor that extracts an area having a property relating to a region of a human body, a ranger that measures a range and an orientation to an object existing in the circumference on the driving route, a range information analyzer that obtains a shape of the object, and an environment recognizer that recognizes the environment information on the driving route. The environment recognizer compares the area extracted in the image recognition processor with the object recognized in the range information analyzer, and recognizes the object as a person when both of them agree with each other.

16 Claims, 19 Drawing Sheets

U.S. PATENT DOCUMENTS

2003/0128153 A1* 7/2003 Paradie et al. .................. 342/70
2003/0160866 A1* 8/2003 Hori et al. .................... 348/116

FOREIGN PATENT DOCUMENTS

| | | |
|---|---|---|
| JP | 63-213005 | 9/1988 |
| JP | 2-259912 | 10/1990 |
| JP | 7-213753 | 8/1995 |
| JP | 7-325620 | 12/1995 |
| JP | 9-326096 | 12/1997 |
| JP | 11-104984 | 4/1999 |
| JP | 11-198075 | 7/1999 |
| JP | 2000-123298 | 4/2000 |
| JP | 2000-326274 | 11/2000 |
| JP | 2002-056388 | 2/2002 |
| JP | 2002-202815 | 7/2002 |
| JP | 2003-280739 | 10/2003 |
| JP | 2004-171165 | 6/2004 |
| JP | 2004-178229 | 6/2004 |

OTHER PUBLICATIONS

English Language Abstract of JP 2002-056388.
English Language Abstract of JP 2000-326274.
English Language Abstract of JP 11-104984.
English Language Abstract of JP 11-198075.
English Language Abstract of JP 2-259912.
English Language Abstract of JP 2003-280739.
English Language Abstract of JP 2004-171165.
English Language Abstract of JP 7-325620.
English Language Abstract of JP 63-213005.
English Language Abstract of JP 63-124114.
English Language Abstract of JP 7-213753.
English Language Abstract of JP 9-326096.
English Language Abstract of JP 2004-178229.
English language Abstract of JP 2002-202815, Jul. 19, 2002.
Ishay Kamon et al., "TangentBug: A Range-Sensor-Based Navigation Algorithm", in the International Journal of Robotics Research, vol. 17, No. 9, Sep. 1998, pp. 934-953.

* cited by examiner

INPUT IMAGE

DETECTION RESULT OF AREA OF COLOR OF SKIN

AREAS OF COLOR OF SKIN ON EDGE IMAGE

RESULT OF PERSON RECOGNITION

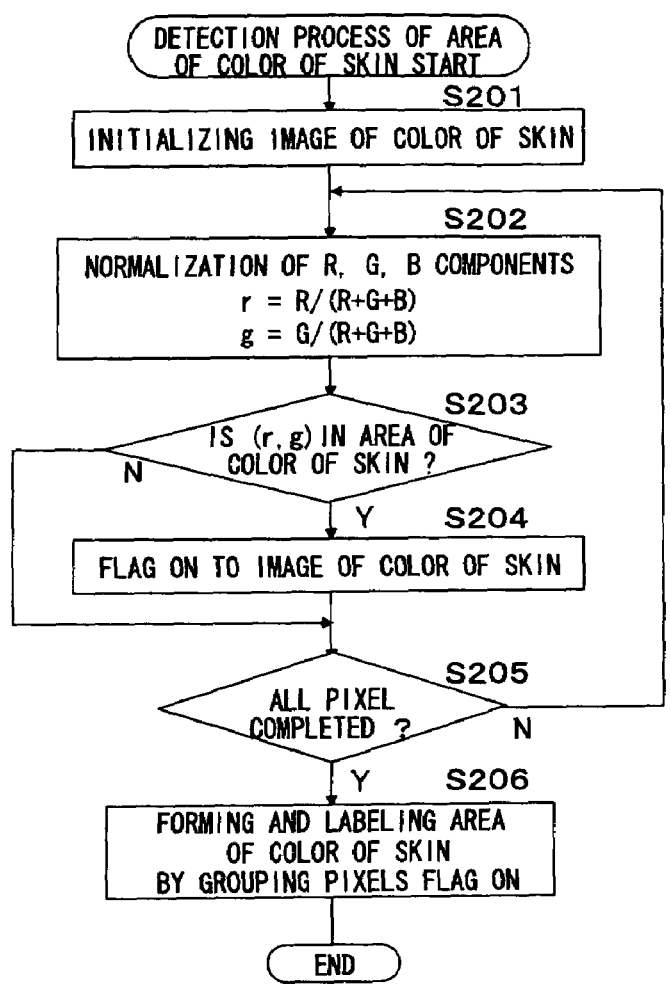
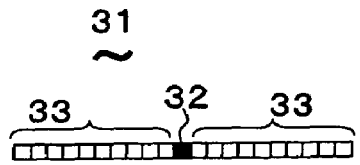
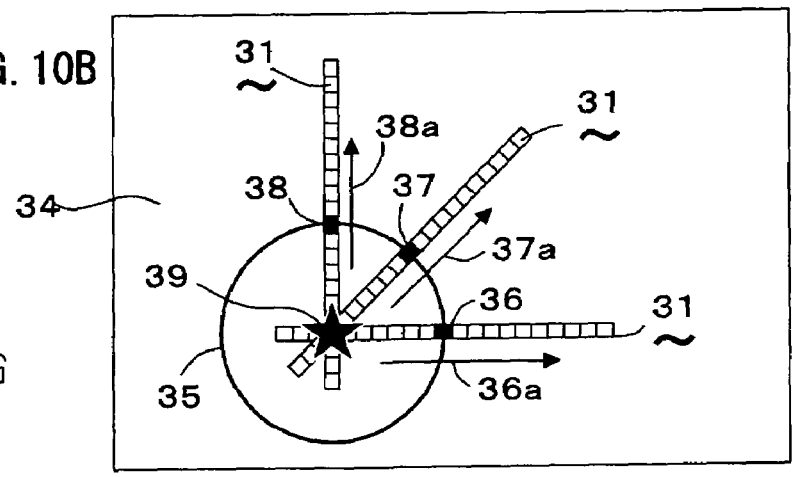

| i | ANGLE θ (i) (°) | RANGE d(I) |
|---|---|---|
| 0 | 0.0 | L OR MORE |
| 1 | Δθ | L OR MORE |
| 2 | 2 × Δθ | L OR MORE |
| : | 3 × Δθ | L OR MORE |
| : | 4 × Δθ | L OR MORE |
| : | : | : |
| | 90.0 − d1 − Δ | L OR MORE |
| | 90.0 − d1 | L1 |
| : | : | : |
| | 90.0 + d2 | L2 |
| | 90.0 + d2 + Δ | L OR MORE |
| : | : | : |
| | 180.0 − 4 × Δ | L OR MORE |
| : | 180.0 − 3 × Δ | L OR MORE |
| : | 180.0 − 2 × Δ | L OR MORE |
| : | 180.0 − Δθ | L OR MORE |
| n | 180.0 | L OR MORE |

AUTONOMOUSLY MOVING ROBOT

TECHNICAL FIELD

The present invention relates to an autonomously moving robot which can move to a destination evading an obstacle.

BACKGROUND ART

Conventionally, an autonomously moving robot, which senses an obstacle with using a ranging sensor such as a laser-radar or sonar, and performs driving control, is known. In order to drive the autonomously moving robot safely, it is necessary not only to detect the obstacle but also to control it with recognizing what is the detected object. For recognizing the detected object, precise ranging is necessary in whole three-dimensional space. Therefore, it is known to control the driving with obtaining space information from an image provided by a camera. For example, a robot driving with using range information and image information (referring to U.S. Pat. No. 5,525,882) and a technique for measuring a transversal location of an obstacle utilizing a CCD camera and a ultrasonic sensor (referring to Japanese Laid-Open Patent Publication No. 2000-123298) are known.

Furthermore, a robot which moves with recognizing a person by detecting head or front face of the person from images of two cameras is known (referring to Japanese Laid-Open Patent Publication No. 2002-56388). In such literature, a range to the object is calculated from stereographic images. However, when the range to the object is shorter, measurement error becomes larger, so that it is disclosed that the range information by the ranging sensor is used. Still furthermore, a robot, which detects face of a person and calculates a range to the person from images by a stereographic camera and autonomously moves, is known (referring to Japanese Laid-Open Patent Publication No. 2000-326274).

DISCLOSURE OF INVENTION

The technique disclosed in the above-mentioned U.S. Pat. No. 5,525,882, however, intends for an obstacle having a body face which becomes a roadblock for the driving, and the driving is not controlled with judgment what the object is. Furthermore, the technique disclosed in Japanese Laid-Open Patent Publication No. 2000-123298 recognized merely spreading in a transverse direction of the obstacle, and it does not control with judgment what the object is. Still furthermore, the techniques disclosed in Japanese Laid-Open Patent Publications No. 2002-56388 and No. 2000-326274 mainly detects the person from stereographic image information, so that accuracy of detection is lower, and it may detect an obstacle erroneously.

The present invention solves the above problems, and aims to provide an autonomously moving robot which can realize obstacle recognition of high reliability and can move safely and smoothly by judging the object is a person by considering together with object shape information obtained from distance information by a ranging means such as a laser-radar or ultrasonic sensor (sonar) measurable of range and orientation to an object and area information having a property relating to region of a human body obtained by image processing.

For achieving the above-mentioned aim, in an autonomously moving robot, the present invention comprises: a memory means for memorizing map information of driving domain and various parameters for driving; an input instruction means for inputting a destination and a command for moving; a route forming means for forming a driving route to the destination; an environmental information acquisition means for acquiring environmental information on the driving route including an object becoming an obstacle; a driving means for driving it; a self-location recognition means for recognizing a self-location on a basis of information provided by the above environmental information acquisition means and the map information; and a driving control means for controlling the driving means to arrive at the destination while evading obstacles with recognizing the self-location by the self-location recognition means by oneself; wherein the above environmental information acquisition means further comprises: an imaging apparatus for taking an environmental image on the driving route; an image recognition processing means for extracting an area having a property relating to a region of a human body by arithmetically processing a photographed image data; a ranging apparatus for detecting an object existing in an environment on the driving route and measuring a range and an orientation of the object; a range information analyzing means for obtaining a shape of the object by arithmetically processing a range data of the measured object and recognizing the object is a candidate of a person from the shape; and an environment recognition means for comparing a location of an area having the property extracted by the image recognition processing means with a location of an object which is recognized as a candidate of a person by the range information analyzing means, and recognizing the object as a person when both of them agree with.

According to the present invention, the shape of the object is obtained from the range data having high accuracy of measurement, position information recognized as a candidate of a person from the shape and position information of an area having a property relating to a region of human body from image information from which environmental information of wide area can be obtained are combined, and judged that a person is detected when both position information agree with each other, so that the detection of a person with high reliability can be realized. Consequently, safety and smooth driving of the autonomously moving robot can be realized. The above-mentioned position information includes orientation.

In the above-mentioned present invention, it is possible that the image recognition processing means arithmetically processing an image data with respect to the orientation of the object obtained by the range information analyzing means, and the environment recognition means performs recognition processes with respect to a portion corresponding to the orientation of the object. Thereby, the area where no obstacle exists is not processed, so that it is possible to reduce a quantity of calculation of the image recognition can be reduced. Furthermore, only an area where the obstacle exists can be recognition processed by the image, so that the environmental recognition with high reliability can be performed.

It is sufficient that the ranging apparatus performs ranging with respect to an area extracted by the image recognition processing means, and the environment recognition means performs recognition processing with respect to a portion corresponding to the orientation of the extracted area. Thereby, useless range information acquisition process can be dispensed. Especially, when there are many things having similar shape as that of the object to be recognized according to the range information, for example, when a person is intended to be detected or recognized as a post shaped object, even though there are many columns, legs of tables, and so on, the range information with respect to only a candidate area of the obstacle obtained from the image information acquisition means is acquired, so that effective range information acquisition process can be performed.

As for the ranging apparatus, it is possible to use a laser-radar which measures a range to an obstacle by scanning a plane parallel to a driving road surface at a previously set angle. Thereby, measurement data with high accuracy of position measurement can be obtained, so that it is possible to recognize the shape of the obstacle. Furthermore, since the shape of the obstacle on a measurement plane can be found, it is possible to use a data for estimating the obstacle.

It is possible that the range information analyzing means recognizes an object as a candidate of a person when a width of the object obtained by arithmetically processing the range data is in a previously established region. Thereby, legs of a person who stands, legs of a person who shits on a chair or the legs of the chair are generally regarded as post shape, so that it is possible to estimate whether the obstacle is a human or not easily by shape analysis on a measurement plane.

It is possible that the range information analyzing means recognizes an object as a candidate of a person when a measured range to the object is not coincided with a range to an object on a memorized map. Thereby, by judging that an object not included in the map may be a person, it is possible to detect a person easily. A photograph of a person on a wall never be erroneously recognized as a person.

It is possible that the imaging apparatus is a camera mounted on the autonomously moving robot, and coordinate of an image taken by it can be converted to a standard coordinates system of the autonomously moving robot. Thereby, the imaging apparatus with simple configuration and low cost can be realized by disposing the camera in a predetermined orientation.

It is possible that the image recognition processing means includes at least a specific color area detecting unit for detecting a specific color area from a photographed image data and a shape characteristic processing unit for arithmetically processing with respect to a shape of a specific color area detected by the specific color area detecting unit, and recognizes the specific color area as a candidate of a person when the detected specific color area satisfies shape characteristic condition previously established. Thereby, it is possible to detect a person with high reliability by using both of an area of specific color showing a characteristic of a person well, such as an area of a color of skin and a characteristic of the shape of a person on the image.

It is possible that the environment recognition means calculates a ratio of a planar dimension of an area of a color of human skin detected in the image with respect to a planar dimension of an area of a color of human skin at a range previously established from the autonomously moving robot to a person, and judges whether the detected person awakes the autonomously moving robot or not by comparing the ratio with a threshold value previously established. Thereby, it is possible to recognize not only whether a person exists or not but also a condition of the person whether the person detected awakes the autonomously moving robot or not, so that safety and smooth driving can be realized by the information of person's condition.

It is possible that the driving control means controls the driving means to stop when an object recognized as a person exists in a moving direction of the autonomously moving robot and within a range previously established, to evade an obstacle when the object recognized as a person does not exist in the moving direction of the autonomously moving robot, and to proceed the driving when no obstacle exists. Thereby, safety for a person can be assured.

It is possible that the driving control means controls the driving means to drive for evading an object recognized as a person with a range previously established when the object recognized as a person exists in a moving direction of the autonomously moving robot. Thereby, when it is necessary to advance to the destination evading a person, it is possible to move with assuring the safety for the person. In other words, there is no need to take a distance to a detected object except a person and the evading distance can be shortened, so that effective driving of the autonomously moving robot can be performed.

It is possible that the driving control means controls the driving means in a moving speed corresponding to a range or a range and an angle when the object recognized as a person exists in a range previously established. Thereby, effective movement can be performed by a motion that the person feels no disquietude.

It is possible that the driving control means controls the driving means to approach when it is possible to judge that the person detected awakes the autonomously moving robot, and not to approach to the person detected more than a range previously established. Thereby, the autonomously moving robot never approaches to a person who does not awake the autonomously moving robot, so that it never gives the wind up the person.

It is possible that the driving control means takes an attention attracting action to a person when it passes near the person detected. Thereby, it is possible to increase the affinity of the autonomously moving robot to a person.

It is possible that the image information acquisition means (SIC) photographs a person detected, memorizes its image in the memory means or transmits the image to a remote station. Thereby, the surveillance function can be provided on the autonomously moving robot, so that security and anticrime effects can be obtained.

BRIEF DESCRIPTION OF DRAWINGS

FIG. 9 is a flowchart of detection process of an area of a color of skin included in the person recognition process in the above equipment.

FIG. 10A is a drawing of ballot ambit used for detection process of head shape by ballot included in the flow of the person recognition process in the above equipment, and FIG. 10B is a conceptual drawing explaining head detection by the ballot.

BEST MODE FOR CARRYING OUT THE INVENTION

Figure 1:
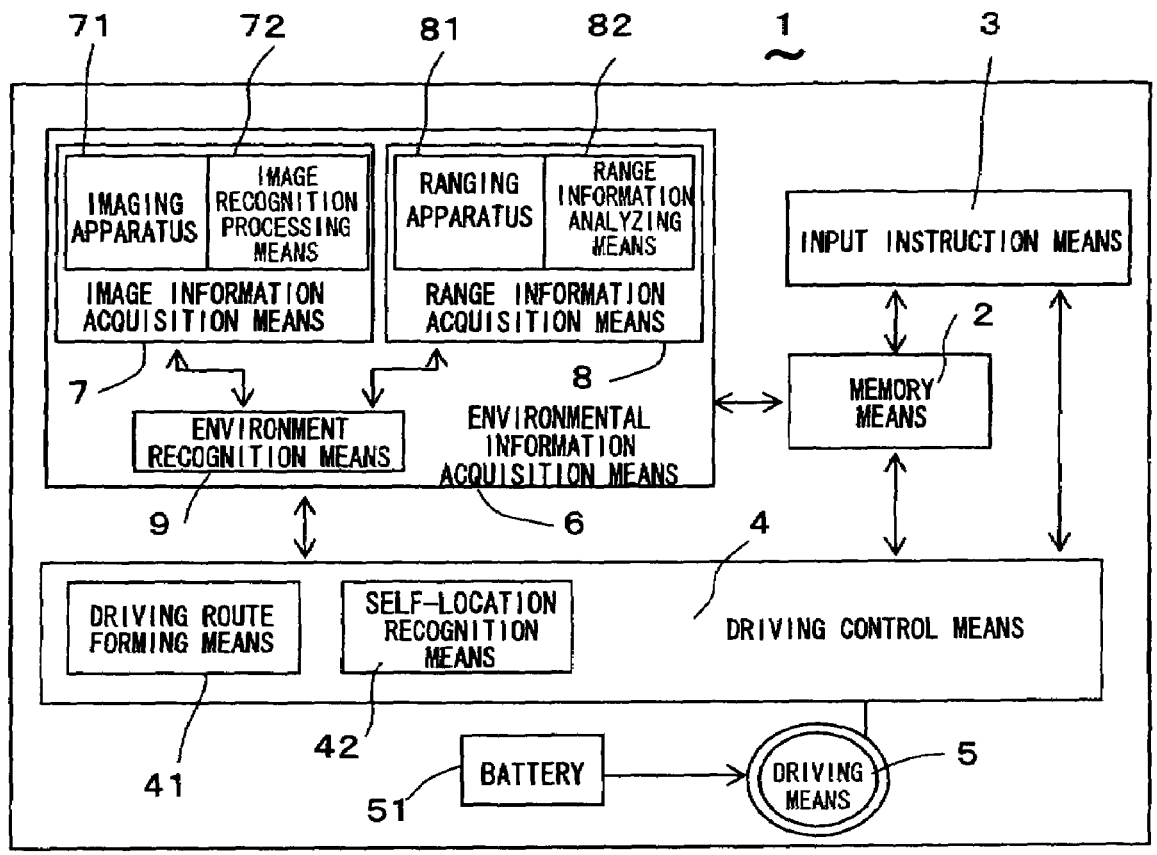
FIG. 1 is a block diagram of an autonomously moving robot in accordance with an embodiment of the present invention.

Hereinafter, an autonomously moving robot in accordance with an embodiment of the present invention is described with reference to drawings. FIG. 1 shows a block construction of this equipment. The autonomously moving robot 1 comprises: a memory means 2 for memorizing map data of driving domain and various parameters for driving; an input instruction means 3 for inputting a destination and a command for moving; a route forming means 41 for forming a driving route to the destination; an environmental information acquisition means 6 for acquiring environmental information on the driving route including an object becoming an obstacle; a driving means 5 for driving itself; a self-location recognition means 42 for recognizing a self-location on a basis of information provided by the above environmental information acquisition means 6 and the map information; and a driving control means 4 for controlling the driving means 5 to arrive at the destination while evading obstacles with recognizing the self-location by the self-location recognition means 42 by oneself.

The environmental information acquisition means 6 further comprises: an imaging apparatus 71 for taking an environmental image on the driving route; an image recognition processing means 72 for extracting an area having a property relating to a region of a human body by arithmetically processing a photographed image data (the above two elements constitutes an image information acquisition means 7); a ranging apparatus 81 for detecting an object existing in an environment on the driving route and measuring a range and an orientation of the object; a range information analyzing means 82 for arithmetically processing a range data of the measured object (the above two elements constitutes a range information acquisition means 8); and an environment recognition means 9 for recognizing the environment information on the basis of object information having a property previously established which is obtained by the image recognition processing means 72 and range information obtained by the range information analyzing means 82. The environment recognition means 9 outputs the environment information on the driving route to the driving control means 4.

The self-location recognition means 42 estimates where the self-location is located on the map while the driving with using, for example, an encoder mounted on the driving means 5 or built-in gyro, and compensates an estimated value of self-location with using the self-location information obtained by the environment information acquisition means 6.

As for the self-location information obtained by the environment information acquisition means 6, for example, a mark which can be recognized by the same means 6 is installed in driving environment previously, and the mark is registered in the map data, it is possible to recognize the mark as the self-location information in the driving. The driving control means 4 searches the registered mark on the map on based on mark position information according to a relative position which is transmitted on the basis of estimated position itself. When the mark is detected, the self-location can be recognized from the relative position information on the basis of the position of the mark. When more than two marks can be detected, the self-location can be established uniquely.

Furthermore, the environmental information acquisition means 6 detects an obstacle during driving, and transmits the position information to the driving control means 4. The driving control means 4 revises the driving route to avoid the obstacle, and transmits a control output to the driving means 5. In this way, the autonomously moving robot 1 runs to the destination where was directed along the driving route while recognizing the self-location and while evading obstacles.

Figure 2:
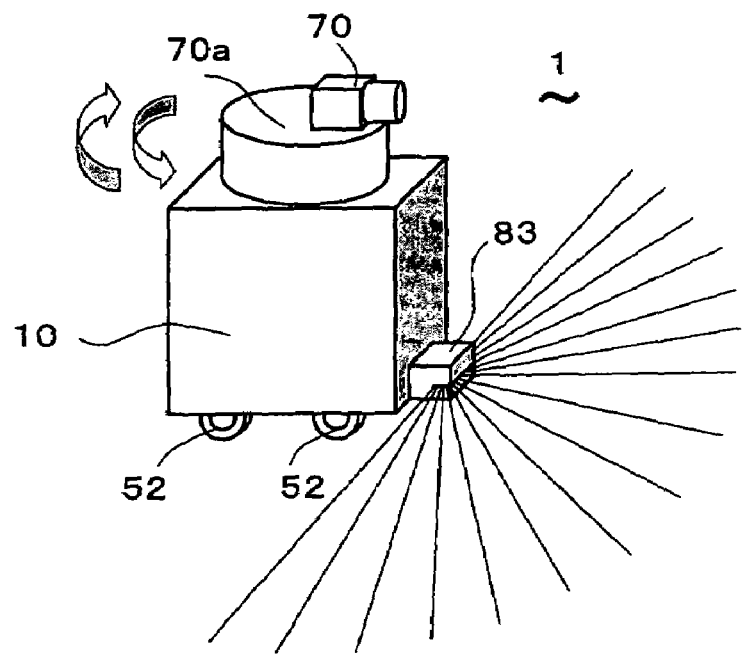
FIG. 2 is a perspective view showing an appearance of the above equipment.

FIG. 2 shows an appearance of the autonomously moving robot 1. The autonomously moving robot 1 comprises a laser-radar (laser range finder) 83 as a ranging apparatus 81 of the range information acquisition means 8, and comprises a camera 70 mounted on a rotary mechanism 70a rotatable (horizontal rotation) with respect to a main body 10 of the autonomously moving robot 1 as an imaging apparatus 71 of the image information acquisition means 7. Furthermore, the equipment moves by driving of wheels 52 by, for example, a battery 52, and a mileage is measured by monitoring the rotation of the wheels 52, so that it is used as information for recognizing the self-location. Elaborations of this equipment are sequentially explained below from the image information acquisition means.

(Constitution of the Image Information Acquisition Means)

Figure 3:
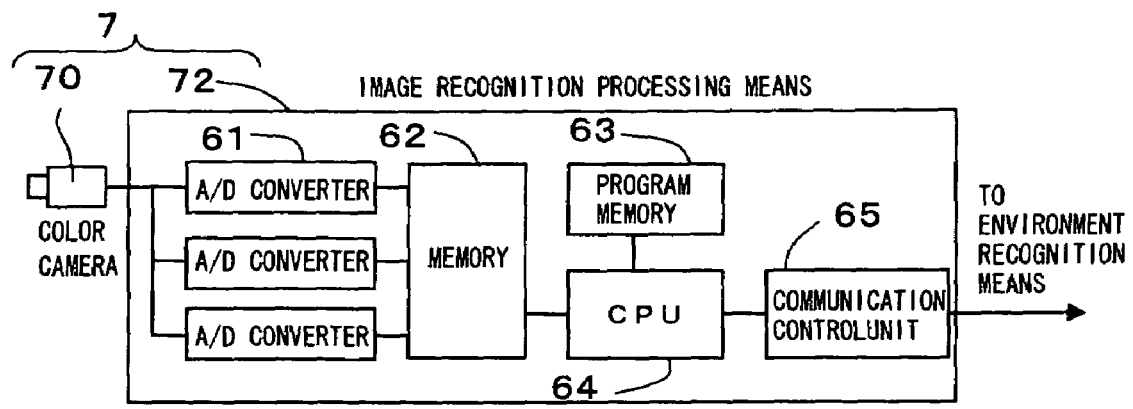
FIG. 3 is a block diagram of an image recognition processing means of the above equipment.
Figure 4:
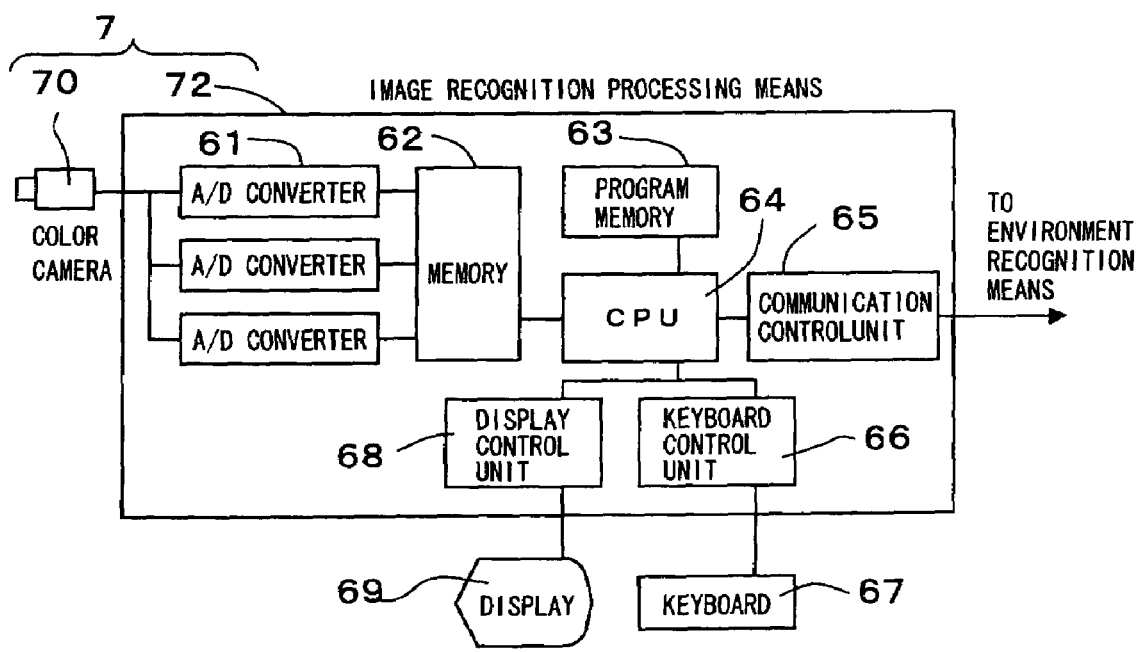
FIG. 4 is a block diagram showing another example of the image recognition processing means of the above equipment.

The autonomously moving robot 1 of the present invention judges what the obstacle is by accounting two kinds of obstacle information of a detection result of the obstacle partially obtained from the ranging means such as a laser-radar or sonar, and a detection result of the obstacle obtained by image processing. First, the measurement result of the obstacle by the image processing is described. FIG. 3 and FIG. 4 show block configurations of the image information acquisition means 7. An image recognition attention means 72 digitizes an image signal input from a color camera (imaging apparatus) 70 with A/D converter 61, and memorizes it into a memory 62 as a digital image. A software on which processing algorithm is written is called from a program memory 63 to a CPU 64 performing arithmetic processing for the image, and the CPU 64 executes person detection process from the digital image following to processing sequence described below with using the software. The result of image processing is transmitted to the driving control means 4 through the environment recognition means 9 by a communication control unit 65.

Furthermore, in order to operate the image information acquisition means 7 (the camera 70 and the image recognition processing means 72) and to display the processing results by operating devices of the main body 10 of the autonomously moving robot by an operator locally, that is, at the main body 10 of the autonomously moving robot, it is possible to provide a keyboard control unit 66, a keyboard 67, a display control unit 68 and a display unit 69 in the image recognition processing means 72, as shown in FIG. 4. Still furthermore, it is possible to control the operation of the image information acquisition means 7 via the communication control unit 65 from outside.

(Imaging Apparatus)

Figure 5A:
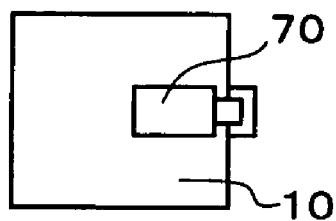
FIG. 5A is a plan view of the above equipment.
Figure 5B:
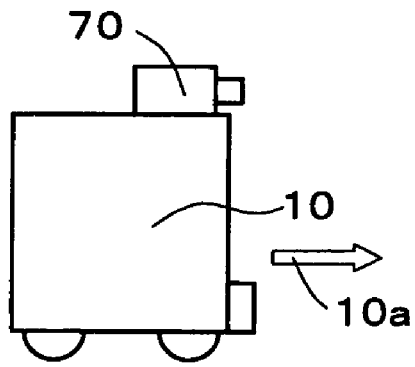
FIG. 5B is a side view of the same.
Figure 5C:
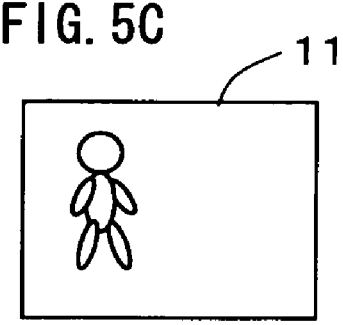
FIG. 5C is a drawing showing an image that an imaging apparatus of the above equipment takes.

An imaging apparatus 71 is explained. FIG. 5A and FIG. 5B show the imaging apparatus 71 comprising a stationary camera, and FIG. 5C shows a photographed image taken by it. The camera 70 is fixed on the main body 10 of the autonomously moving robot, and takes view of ahead in moving direction 10a of the main body 10 of the autonomously moving robot as an image 11. Coordinate system of the camera 70 moves with a standard coordinate system defined by being fixed on the main body 10 of the autonomously moving robot.

(Image Recognition Processing Means)

Figure 6:
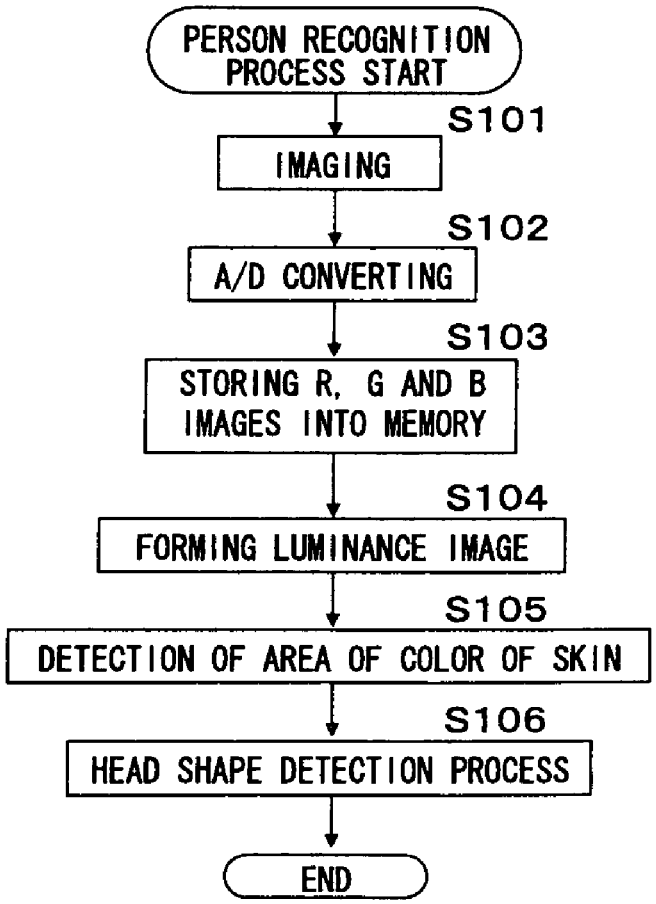
FIG. 6 is a flowchart of person recognition process by the image recognition processing means in the above equipment.

A method for detecting a person or a specific object by arithmetically processing the image data taken by the imaging apparatus 71 by the image recognition processing means 72 is described. Hereupon, as for the property relating to a region of human body, a head portion of a person, especially a color of skin of a face is used. FIG. 6 shows flow of entire processing for recognizing a person from an image (flow of person recognition process).

Circumferential condition of the autonomously moving robot, for example, view of ahead in moving direction is taken by the color camera as the imaging apparatus 71 (S101), analogous imaging signals thereof are digitalized by the A/D converter 61 (S102), and digital images or respective color component consists of R, G and B (red, green and blue) of three components of color are stored in the memory 62 (S103). Subsequently, an image of luminance $I=(R+G+B)/3$ that is averaged three components of color in CPU 64 is formed, and the luminance image is stored in the memory 62 (S104). Subsequently, detection process of an area of a color of skin from the image is performed (S105), and head shape detection process is performed on the basis of an edge image with respect to the detected area of the color of skin (S106). A position of the detected head portion is outputted to the environment recognition means 9 as a result of the person recognition.

Figure 7A:
FIG. 7A is a drawing of an input image which becomes an object of person recognition process in the above equipment.
Figure 7B:
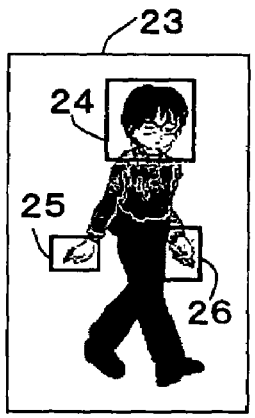
FIG. 7B is a drawing of an image showing result of detection of an area of a color of skin by the same process.
Figure 7C:
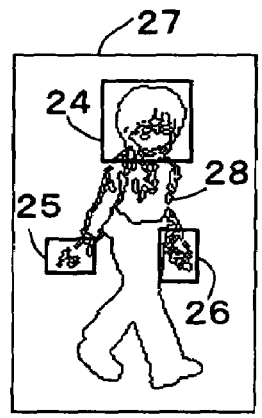
FIG. 7C is a drawing of an edge image including the area of the color of skin by the same process.
Figure 7D:
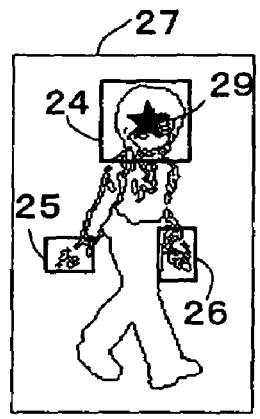
FIG. 7D is a drawing of an edge image showing result of the person recognition by the same process.

A manner of the flow of the above-mentioned process is described with using an image which becomes an object to be processed. FIG. 7A shows an input image, FIG. 7B shows an image of detection result of the area of the color of skin, FIG. 7C shows an image showing the area of the color of skin on the edge image, and FIG. 7D shows an image outputting recognition result, respectively. First, areas of the color of skin 24 to 26 are detected on an input image 21 (in an image 23), and the head shape detection process is performed on an edge image 27 only for the detected areas of the color of skin 24 to 26, so that effective processing can be performed.

Figure 8:
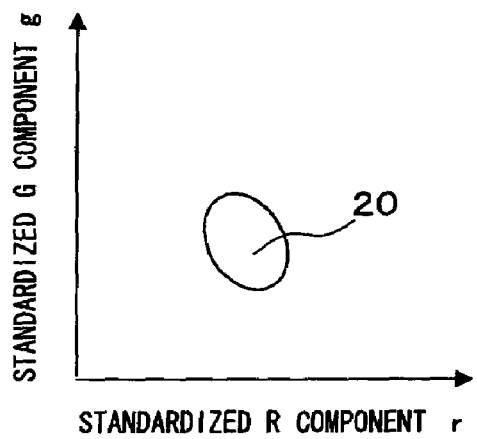
FIG. 8 is a conceptual drawing of a normalization color space that is used in the above equipment.

A normalization r-g space used for detection of the areas of the color of skin in the image is described. FIG. 8 shows the normalization r-g space (plane). R component and G component in color image are normalized by computation expressions $r=R/(R+G+B)$ and $g=G/(R+G+B)$, with using luminance values R, G and B of color components in each pixel, and normalized values of r and g are provided. Generally, since colors of human skin form an area 20 on the r-g plane, as shown in FIG. 8, it is possible to judge whether the pixel is a color of skin or not by whether the normalized values of r and g obtained from each pixel of the color image are included in this area 20 or not. This area 20 of the color of skin is previously formed on the basis of a lot of data of color of skin of images.

Elaboration of detection process of areas of a color of skin is explained. FIG. 9 shows a flow of the detection process of areas of a color of skin. First, in the CPU 64, a portion of the memory 62 which memorize the images of the region of the color of skin is initialized (S201). Subsequently, R component and G component of each pixel of the input image are normalized by the computation expressions $r=R/(R+G+B)$ and $g=G/(R+G+B)$ (S202). The normalized values of r and g of the R component and the G component are examined whether they are included in the area 20 of the color of skin or not (S203), and when they are in the area of the color of skin, the pixel is judged as a color of skin (Y in S203), and flag of color of skin is turned on at a position corresponding to the pixel of a color of skin (S204). After completing these processes with respect to all pixels of the input image (Y in S205), the pixels on which the flag of color of skin is turned on are grouped on the image of the color of skin, and an area of a color of skin consisting of, for example, a rectangular area is formed on the basis of the group. Labeling process is performed to such area of the color of skin, and each area is distinguished, consequently the area of the color of skin 24 to 26 are obtained as shown in FIG. 7B mentioned above (S206).

A method for detecting a shape of a head by ballot processing from the detected area of the color of skin is described. FIG. 10A shows a ballot frame establishing a ballot limit used in the ballot processing, and FIG. 10B shows a usage of the ballot frame. The detection of the shape of the head is performed utilizing the fact that the head has substantially circular shape. For example, it is assumed that edge pixel confluence 35 showing lines of face is obtained in an edge image 34 which is a result of image processing for extracting the edge to an image including a face of a person (for example, differential processing for luminance of image). A ballot space which assumes each pixel of the edge image 34 as a ballot bin (a ballot box) is set. Furthermore, it is assumed that a luminance inclination direction is established with respect to each pixel of the edge pixel confluence 35, for example, like the luminance inclination direction 36a with respect to the pixel 36. Generally, there is light and shade change in a face of a person and an image of the background, and the luminance inclination direction of the edge pixel of line of face goes from center to outside or from outside to center.

Therefore, a center point 32 of a stick shaped ballot frame 31 which is set to include a dimension of a head becoming an object to be detected is put on, for example, an edge pixel 36, the direction of the ballot frame 31 is set to be the luminance inclination direction 36a of the edge pixel 36, and all the ballot bins in the ballot limit overlapping with the ballot bins 33 of the ballot frame 31 are balloted. By performing such balloting to all the pixels on the edge pixel confluence 35 showing lines of face, the ballot bin disposed at the center of face is balloted much larger than the other, as shown by an asterisk 39. In this way, the results of balloting process along the outer shape of the head are concentrated to the center of the head, so that when a ballot bin having a ballot value larger than a threshold value previously established in the ballot space exists, it is judged that a head exists around the ballot bin.

Figure 11:
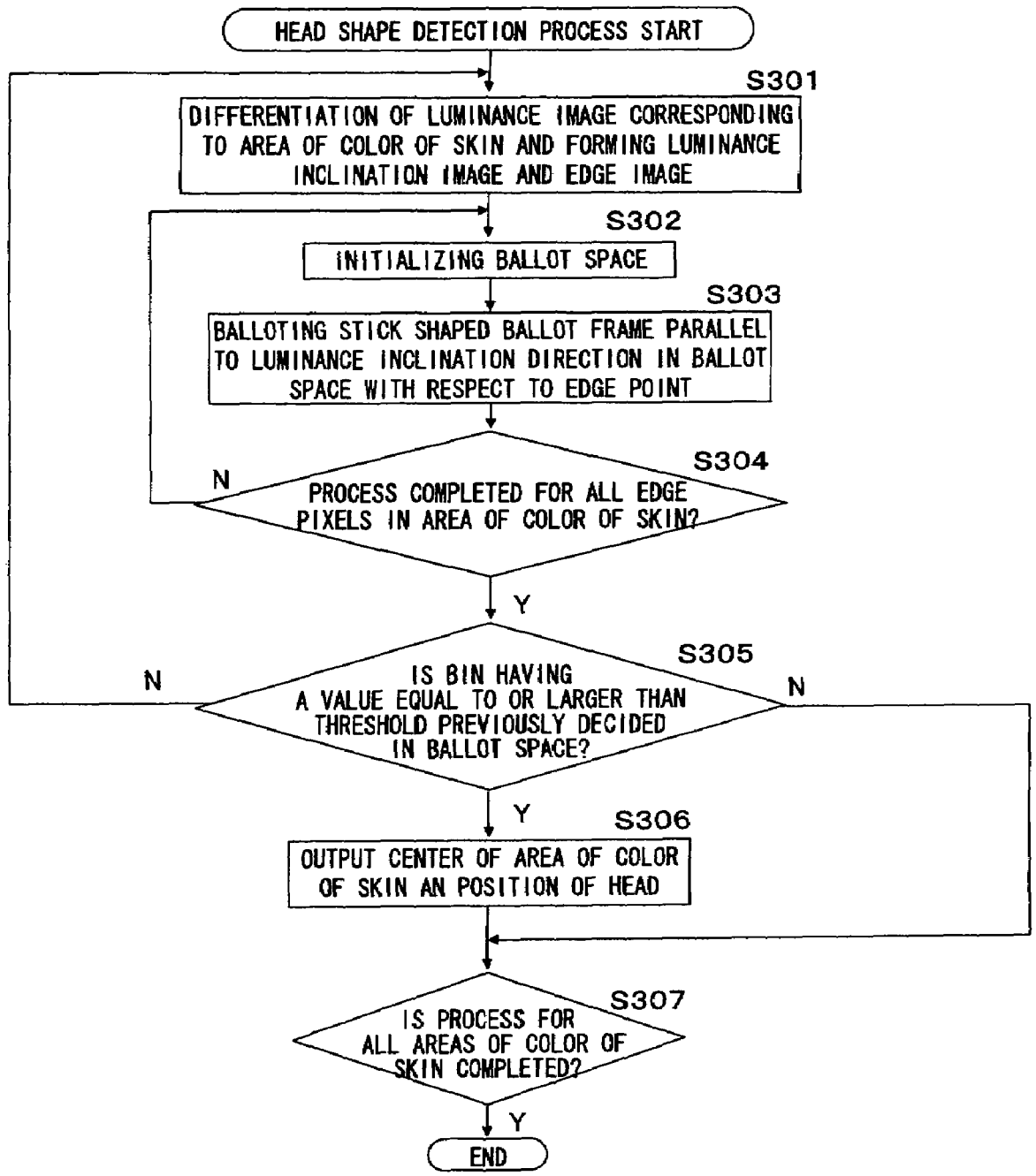
FIG. 11 is a flowchart of the detection process of head shape by the ballot included in the flow of the person recognition process in the above equipment.

Elaboration of head shape detection process is described. FIG. 11 shows a flow of the head shape detection process. First, in the CPU 64, for example, a luminance image of the region of the color of skin 24 is differentiated, and luminance inclination image and edge image are formed (S301). Subsequently, the ballot space which is a memory space memorizing ballot values is initialized (S302). Subsequently, with respect to all edges pixels in the area of the color of skin 24, the ballot is performed to each ballot bin in the ballot space selected by disposing the stick shaped ballot frame in the luminance inclination direction of each edge pixel (S303). After completing the ballot with respect to all edge pixels in the area of the color of skin 24 (S304), existence of a ballot bin having a ballot value equal to or larger than the threshold value previously established is examined. When such a ballot bin exists (Y in S305), the center position of the area of the color of the skin is outputted as a position of a head to the environment recognition means 9 via the communication control unit 65 (S306). When the above mentioned processes are performed to all the areas of the color of skin, the head shape detection process is completed (S307). In the case of FIG. 7D mentioned above, the area of the color of skin 24 among the regions of the color of skin 24, 25 and 26 is detected as the shape of the head, and the position of the asterisk 29 is established as the position of the head.

A method for identifying an orientation in actual space of the detected position as the position of the head from the areas of the color of skin on the image is described. The identification of the orientation where a person exists in the actual space is performed in the image recognition processing means 72.

When the imaging apparatus 71 is the above-mentioned camera 70 shown in FIG. 5, it is possible to calculate a rough orientation where a person exists from a dimension of a face on the image and a position of the face on the image. The rough orientation where the person may exist identified as above is a candidate of an orientation where a person exists. The result that is recognized as a candidate of the orientation where a person exists in the image recognition processing means 72 is transmitted to the environment recognition means 9 from the communication control unit 65, similar to the result of the detection of the head position on the image. If there is a plurality of results of recognition, all the results are transmitted.

(Range Information Analyzing Means)

Figures 12A, 12B:
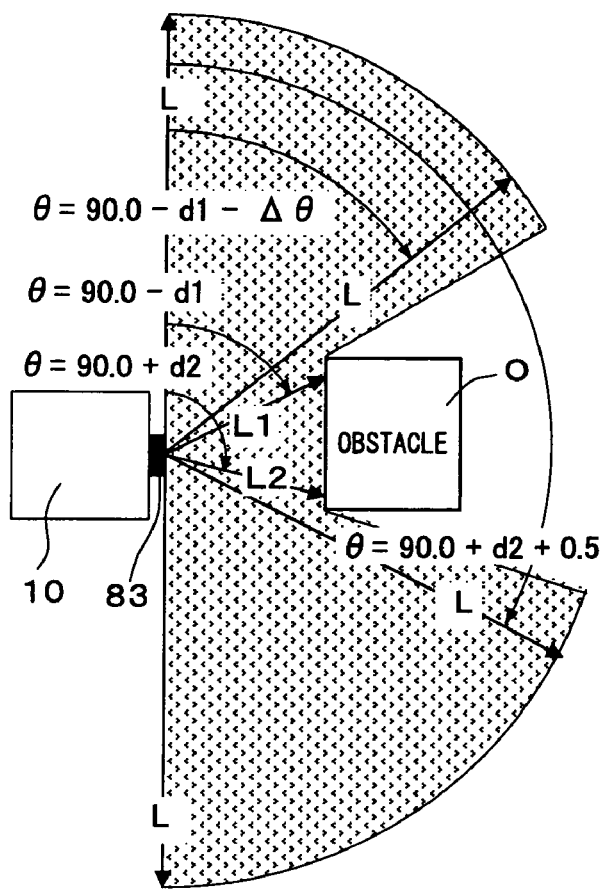
FIG. 12A is a plan view explaining measurement of a range to an obstacle by a laser-radar in the above equipment.
FIG. 12B is a drawing showing a measurement result of the range by the laser-radar.

Recognition of a position of an obstacle by the laser-radar is described. FIG. 12A shows a ranging to an obstacle by the laser-radar 83, and FIG. 12B shows a result of ranging by the laser-radar. When the laser-radar 83 is used for a ranging apparatus 81, a predetermined angle region is horizontally scanned while laser beams are emitted and received, for example, at a predetermined angle $\Delta\theta$. Range data obtained by the laser-radar 83 are comprised of a data that no reflected light is received or a data equal to or longer than a distance L when an object reflecting the laser beam is disposed far from the predetermined distance, and a data of distances L1 or L2 to an obstacle O obtained by the reflected light from the obstacle O, and so on. By using a series of distance data which are measured by setting the predetermined angle $\Delta\theta$ as, for example, 0.5°, a position of a specific shaped object can be recognized (referring to Japanese Laid-Open Patent Publication No. 2002-202815).

When a width of an obstacle (specific shaped object) detected by arithmetically processing such a range data in the range information analyzing means 82 is in a region previously established, it is possible to recognize the object as a candidate of a person by regarding it is, for example, a leg of a person, In this way, it is judged that (a leg of) a person or a chair may exist at a position where an object equal to or narrower than a width previously set in the memory unit 2 (SIC) or within a width region previously set is detected. The position (distribution) of the specific shaped object is recognized as a number of measurement point j which are needed for scanning the width, a range to the object in the width and a group of scanning angle, $D(i)$, $\theta(i)$, $0 \leq i < j$. These range data and orientation data are transmitted to the environment recognition means 9 from the range information analyzing means 82.

In the environment recognition means 9, for example, a candidate orientation where a person may exist which is obtained from the result of image recognition in the image recognition processing means 72 is compared with an orientation where a person may exist obtained from the range information analyzing means 82. When both on them agree with each other, the orientation is judges as the orientation where a person exists, and the orientation and range are transmitted to the driving control means 4.

Figure 21A:
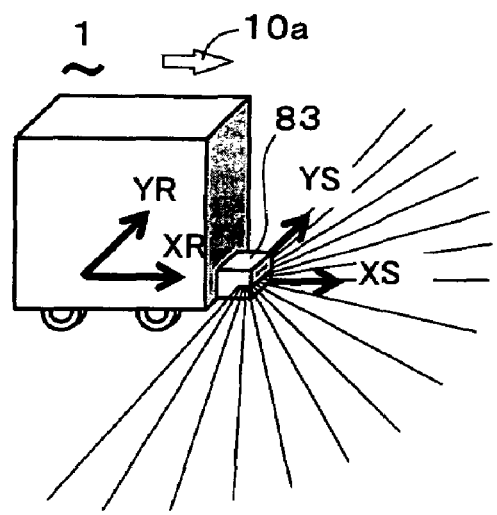
FIG. 21A is a perspective view explaining coordinate transformation of a ranging apparatus in the above equipment.
Figure 21B:
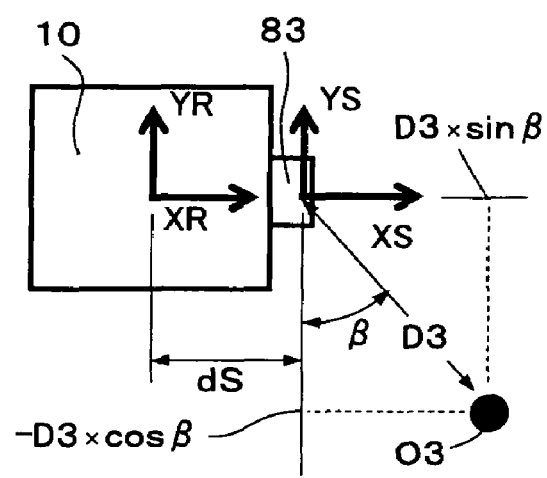
FIG. 21B is a plan view thereof.

In addition, the data $D(i)$ and $\theta(i)$ of the specific shaped object (candidate position of a person) obtained by the laser-radar 83 as the ranging apparatus 81 are the data of the coordinate of the laser-radar 83 (coordinate system of the sensor). Thus, coordinate transformation is performed to the position of the specific shaped object in the range information analyzing means, and it is expressed by the coordinate system (XR, YR) of the main body 10 of the autonomously moving robot, as shown in FIG. 21B which will be described later.

(Detection of Specific Shaped Object)

Figures 13A, 13B:
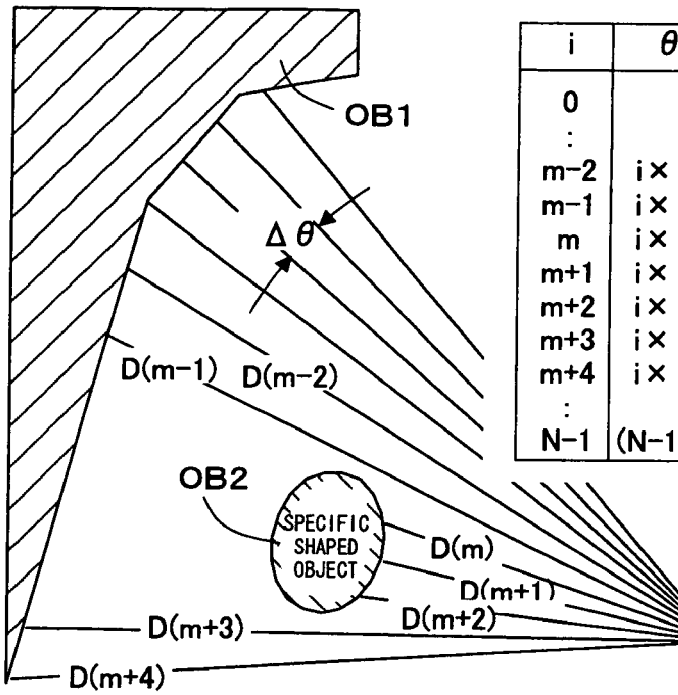
FIG. 13A is a plan view explaining measurement of a range to a specific shaped object by the laser-radar in the above equipment.
FIG. 13B is a drawing showing a measurement result of the range by the laser-radar.

Position recognition of a specific shaped object by the laser-radar is described. FIG. 13A shows a manner of ranging by the laser-radar, and FIG. 13B shows a result of the ranging by the laser-radar. When the laser-radar 83 is used for the ranging apparatus 81, a predetermined angle region is horizontally scanned while laser beams are emitted and received, for example, at a predetermined angle $\Delta\theta$, so that a series of data showing the distance D(i) between the objects reflecting the laser beam OB1 and OB2 and the laser source shown in FIG. 13B are obtained. The data D(i) corresponds to the i-th range data counted from the angle $\theta=0$ in the scanning. In the following description, it is assumed that the ranging is performed N times in the predetermined scanning angle region ($0 \leq i < N$).

Figure 14A:
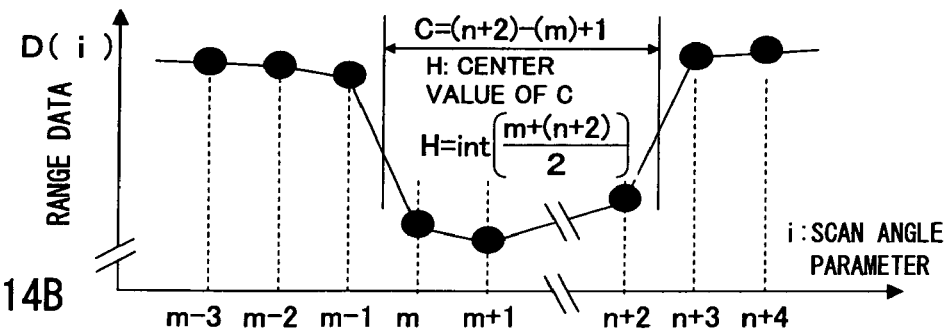
FIG. 14A is a drawing showing a graph of a measurement result of the range of the specific shaped object by the laser-radar in the above equipment.
Figure 14B:
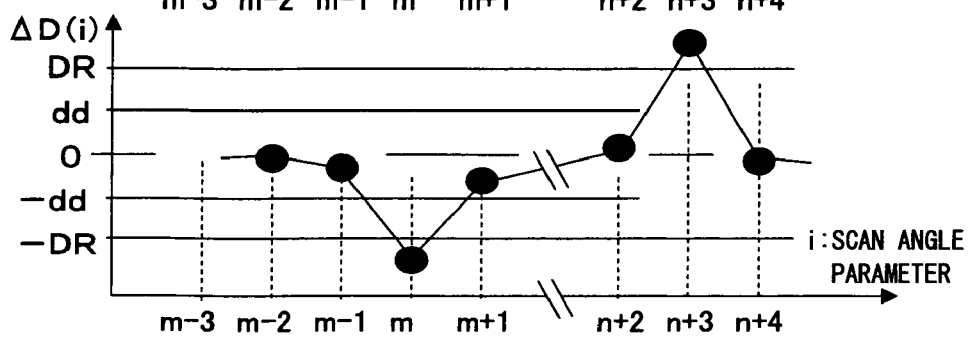
FIG. 14B is a drawing showing a graph of differences of the measurement value of the range.

Characteristics of range data before and after scanning of a specific shaped object are described. FIG. 14A shows a graph of the range data D(i) to the specific shaped object, and FIG. 14B shows a graph of difference $\Delta$D(i) of the range data (these graphs are illustrated as generic graphs, and when parameters n in the figures are replaced as n=m, they will be agreed with the measurement result of FIG. 13 as mentioned above). Generally, when an obstacle is measured, the range data D(i) shows low values in ambit of the obstacle (at points of i=m, m+1,··n+2). In addition, since the measured range data D(i) shows a variation of the range as far-near-far in front and rear of the obstacle, the difference of the range $\Delta$D(i) shows negative and positive peaks at boundaries of the obstacle (at points i=m and n+3).

Therefore, in the graph of the differential value of the range, it is possible to detect the boundaries of the specific shaped object by threshold values DR and -DR previously established. In addition, it is possible to judge a depth of the specific shaped object by establishing setting the largest values of the threshold values dd and -dd with respect to the variation of the range to a surface of the specific shaped object which faces the laser-radar 83. For example, when the appointed specific shaped object is a post shaped object, and the largest width among the post shaped objects to be detected is rr×2, it is possible to establish that dd=rr.

Furthermore, it is assumed that a data number which gives a typical value of the range to the specific shaped object is designated by H. For example, in case of FIG. 14A, it is done with H=int(m+(n+2))/2) with using the data number giving the typical value of the range to the specific shaped object and numbers m and (n+2). Hereupon, int(X) is a function giving the greatest integer number that is not beyond X. In a flow for detecting the specific shaped object, the numbering H giving the typical value of the range, the range data D(H) at the number, and angular data $\theta$(H) are stored. In addition, when a plurality of specific shaped objects to be considered exists, a plurality of data of them is stored.

Furthermore, a threshold level DN is established with respect to an upper limit of a number of series of points of ranging values of the specific shaped object, and when the number ranging value of the specific shaped object, that is, the number C of the points which can be assumed as the ranging points of the specific shaped object is equal to or smaller than the threshold value DN (C<DN), it is judged that the object to be measured is the specific shaped object. It is possible that the value of DN is a fixed value. In addition, for example, a dimension of an object to me detected which can be estimated by a single range data is assumed as D(i)×sin($\Delta\theta$), and the dimension of the specific shape is assumed as D(i)×sin($\Delta\theta$)× C. It is possible that the dimension of the specific shape is previously assumed, and the value of DN is varied at every range. In other words, when the largest width of the specific shaped object is designated by Omax, it is possible to set, for example, the value DN of D(m) as a minimum integer equal to or larger than Omax/(D(m)×sin($\Delta\theta$)).

Figure 15:
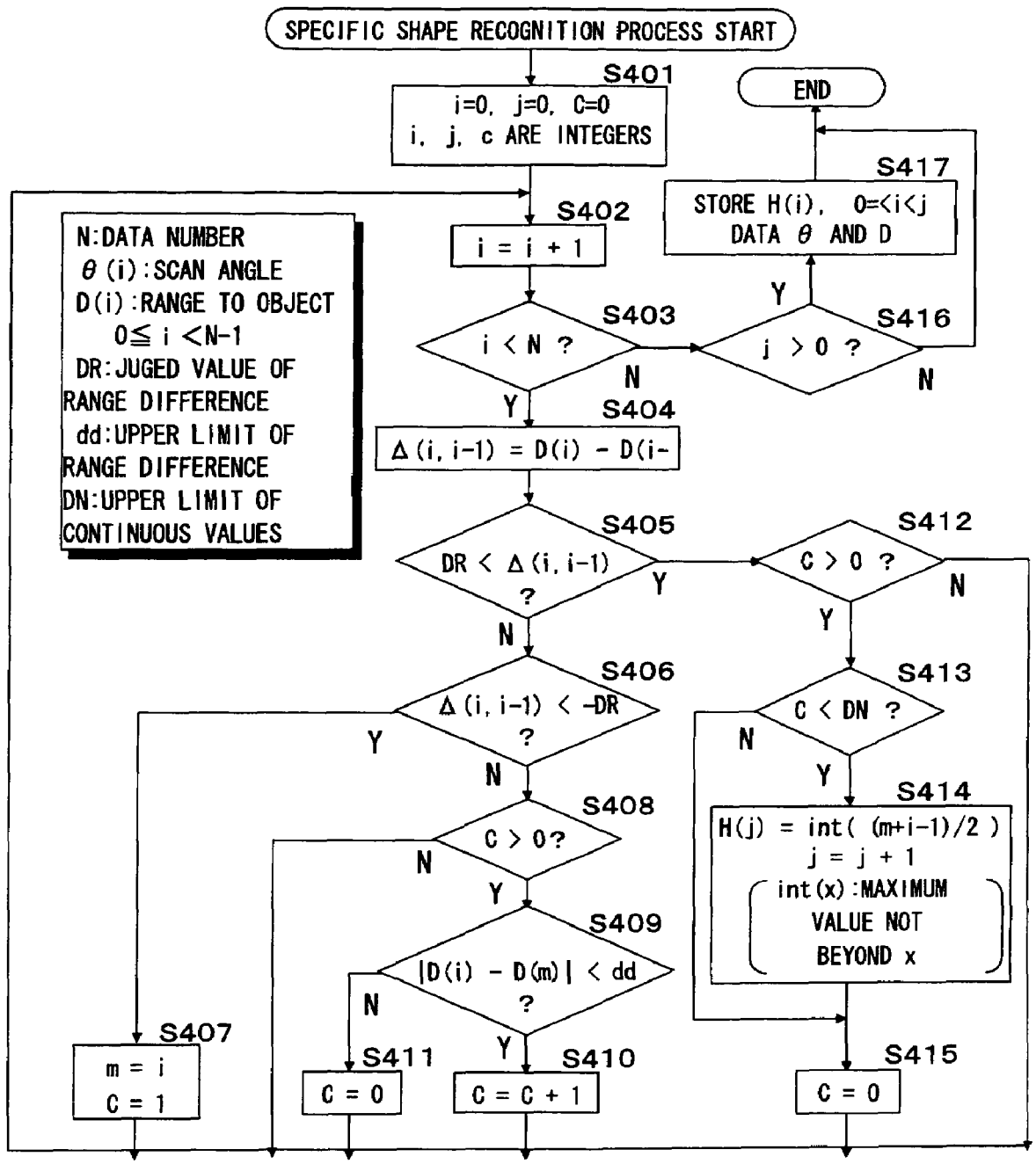
FIG. 15 is a flowchart of specific shape recognition process in the above equipment.

A flow of a process for recognizing the specific shaped object from measured data is described. FIG. 15 shows a flow of a specific shape recognition process. It is explained referring to the measurement result shown in FIG. 13. A data number i is incremented by one in every processing routine (S402), and a value of a difference between adjoining range data $\Delta$(i, i−1)=D(i)−D(i−1) is examined (S405). In the example shown in FIG. 13, since $\Delta$(m, M−1)<−DR at i=m, it goes to step S407, and C=1, m=i are set. Then, since |$\Delta$(m+2, m+1)|≦DR, and D(m+1)−D(m)<dd at i=m, the process passes the steps S408, S409 and S410, and C=2.

Furthermore, since |$\Delta$(m+2, m+1)|≦DR, and D(m+2)−D (m+1)<dd at i=m+2, similarly C=3.

Still furthermore, since |$\Delta$(m+3, m+2)|>DR at i=m+3, the process passes the steps S412, S413 and S414. In addition, int(x) designates a function which returns the largest integer not beyond x.

In this way, D(m), D(m+1) and D(m+2) are judged as the range data obtained by reflection from a single specific shaped object, and a range to the j-th specific shaped object among a plurality of the specific shaped objects is shown by H(j)=int((m+m+2)/2)=(m+1)−th range data (S414). Besides, the value C is reset as C=0 in the steps S411 and S415.

A case using a ultrasonic sensor capable of ranging is used as the ranging apparatus 81 is described. Since the ultrasonic sensor is inexpensive, a plurality of them can be provided around the main body 10 of the autonomously moving robot. When the above-mentioned image recognition processing means 72 judges that a candidate of a person exists in an orientation, the range information analyzing means 82 judges whether the measurement result is a detection of a wall re not with respect to the detection result (range) of a ultrasonic sensor having a detection area to the orientation. When it is not judged as the wall, the candidate of a person is judge as a person. For example, when the range to the object measured by the ultrasonic sensor does not agree with a range to the object (wall) on the memorized map, the range information analyzing means 82 recognizes the measured object as a candidate of a person. In the range information analyzing means 82, by judging that an object not in the map has a high possibility as a person, it is possible to realize a simple person detection. With combining the detection result of the ultrasonic sensor to the result of judgment of the image recognition processing means 72, it disappears to misrecognize a photograph of a person on a wall as a person. Calculation of the range to the object (wall) on the memorized map will be described later.

(Driving Control Means)

Driving control is described. When an orientation and a range of an object to be detected which is recognized as a person are transmitted from the environmental information acquisition means 6, the driving control means 4 controls the driving means 5 to stop when the object recognized as a person exists in a moving direction of the main body 10 of the autonomously moving robot and within a range previously established, so that safety is found for a person. In addition, when the object recognized as a person does not exist in the moving direction of the main body 10 of the autonomously moving robot, the driving control means 4 controls the driving means 5 to evade an obstacle if it exists, and to proceed the driving if no obstacle exists.

Figure 16:
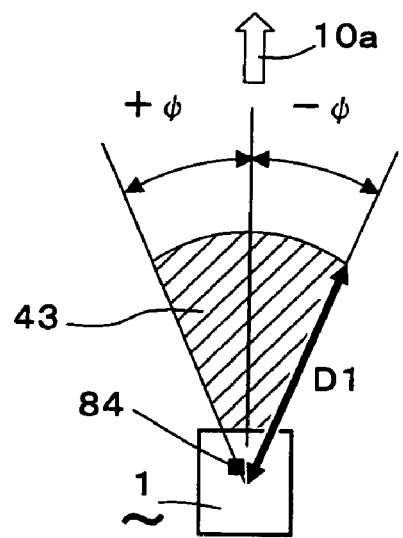
FIG. 16 is a plan view explaining a stopping area when a person is detected in the above equipment.
Figure 17A:
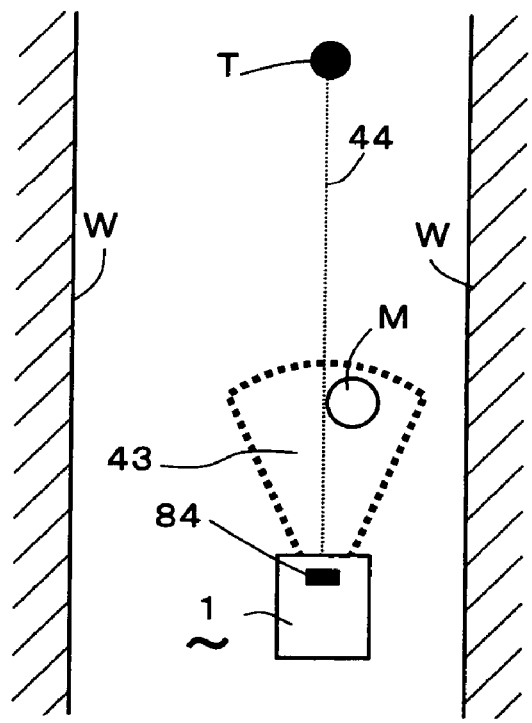
FIG. 17A is a plan view showing stopping motion when a person is detected in the above equipment.
Figure 17B:
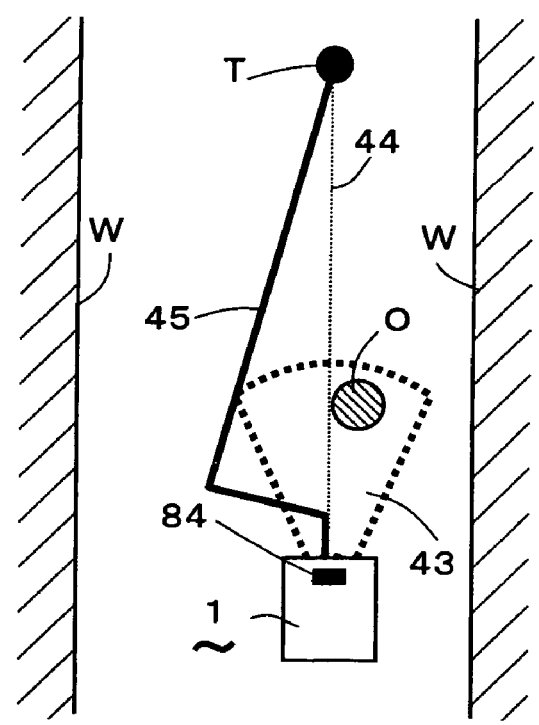
FIG. 17B is a plan view of evading motion when an object except a person is detected.

A person detection stopping area is described. FIG. 16 shows the person detection stopping area 43 based on a ultrasonic sensor 84. In addition, FIG. 17A shows a stopping motion when a person is detected, and FIG. 17B shows an evading motion when an object except a person is detected. As shown in FIG. 16, it is assumed that a range from the autonomously moving robot 1 is D1, and an area within ±φ against the moving direction 10a is established as the person detection stopping area 43. When an object detected in the area 43 is judged as a person M, the autonomously moving robot 1 stops as sown in FIG. 17A. With using the ultrasonic sensor 84, it is possible to establish the person detection stopping area 43, inexpensively. When the object is judges not a person, the autonomously moving robot 1 departs from a predetermined driving route 44, and proceeds to move toward a destination T along a driving route 45 evading the obstacle O.

In addition, as for another method that the driving control means 4 controls the driving means 5 to drive the main body 10 of the autonomously moving robot, it is possible to continue the driving toward the destination evading the obstacles on the basis of the ranging information by the laser-radar with using a method such as TangentBug (The International Journal of Robotics Research, Vol. 17, No. 9, Sep. 1998. pp. 934-953).

Figure 18A:
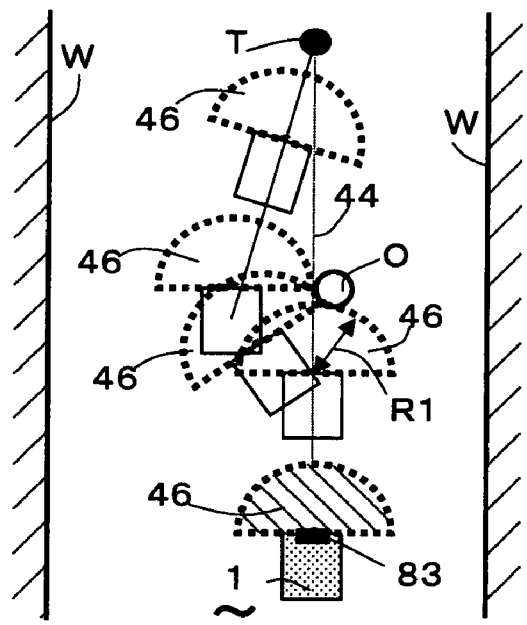
FIG. 18A is a plan view showing evading motion when an object except a person is detected in the above equipment.
Figure 18B:
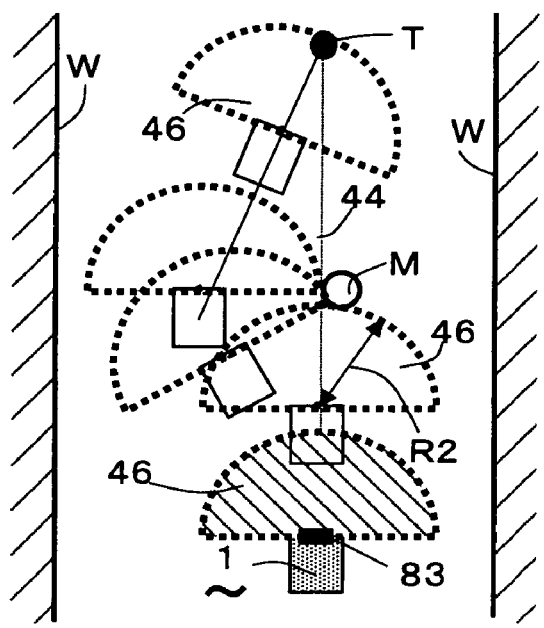
FIG. 18B is a plan view explaining evading motion when a person is detected.

Another method for evading the detected object is described. FIG. 18A shows an evading motion when an object except a person is detected, and FIG. 18B shows an evading motion when a person is detected. When an object recognized as a person exists in a moving direction of the main body of the autonomously moving robot, the driving control means controls the driving means to move evading the object recognized as a person with a distance previously established. In this case, it is possible to change the method for evading the detected object between the case of recognizing the detected object as a person and the case of judging no a person. For example, when the laser-radar 83 is used as the ranging apparatus 81, and when a route is set so as not to include the obstacle O in an established area as a detection area 46, two kinds of detection radiuses R1 and R2 previously established are switched.

When it is judged that the detected object is not a person, the smaller detection radius RI is used as shown in FIG. 18A, and when it is judged as a person, the larger detection radius R2 is used as shown in FIG. 18B. When it is necessary to advance to the destination with evading even if a person exists, driving motion can be performed while assuring safety for a person. In other words, it is no need to evade a detected object except a person with taking a distance, so that the evading distance can be shortened, and consequently, effective movement of the autonomously moving robot is enabled.

A corresponding method for a detected person is described. When an object recognized as a person exists within a predetermined range, the driving control means 4 may control the driving means 5 so as to be a moving speed corresponding to the range or the range and angle to the object. When orientation and range of an object recognized as a person is transmitted from the environmental information acquisition means 6, the driving control means 4 changes the moving speed corresponding to the range. When a speed v is set for the moving speed used in normal driving condition with no obstacle, the driving control means 4 can calculate a speed v1 for avoiding collision as the following equation in algorithm for avoiding collision.

$$v1 = f(h) \times v$$

Hereupon, $f(h)=1$ for $h \geq d$, and $0 \leq f(h) < 1$ for $h < d$. A criterion value d is distance previously set, and a variable h is the minimal length to a detected object recognized as a person. It is possible to set the function $f(h)$ constant.

In addition, instead of the function $f(h)$, a function $g(h, \delta)$ that is further considered an absolute value δ of the angle formed between a detected object recognized as the nearest person and a moving direction of the autonomously moving robot can be used. In this case, a speed v2 for avoiding collision can be calculated as the following equation.

$$v2 = g(h, \delta) \times v$$

Hereupon, $g(h, \delta)=1$ for $h \geq d$, and, $0 \leq g(h, \delta) < 1$ for $h < d$. For example, when $h < d$, and $\delta \leq 90°$, it is possible to set as $$g(h, \delta) = 0.5 \times (1 - 0.2 \times (90 - \delta)/90).$$

In this way, by setting the moving speed corresponding to a range or angle to an object recognized as a person, effective movement of the autonomously moving robot can be realized with a motion which gives no uncertainty to a person. Furthermore, when the detected object is not a person, there is no need to reduce the moving speed, so that effective driving of the autonomously moving robot can be realized.

Figure 19A:
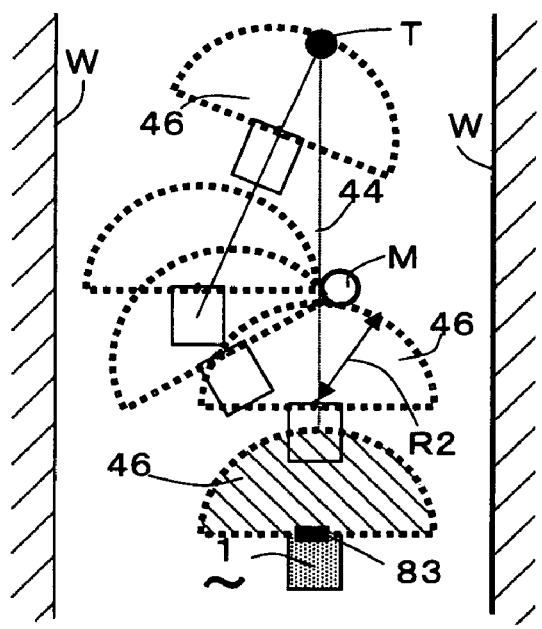
FIG. 19A is a plan view explaining evading motion to a person who awakes the equipment in the above equipment.
Figure 19B:
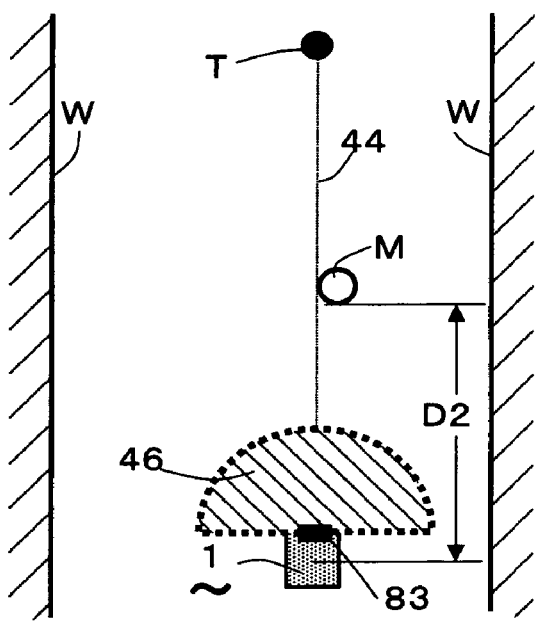
FIG. 19B is a plan view explaining stopping motion to a person who does not awake the equipment.

Another corresponding method to a person detected is described. FIG. 19A shows an evading motion to a person who awakes the autonomously moving robot, and FIG. 19B shows an evading motion to a person who does not awake the equipment. The driving control means 4 controls driving means to approach the detected person when it is possible to judge that the detected person awakes the autonomously moving robot, and not to approach to the detected person equal to or nearer than a range previously established to the contrary. When information awaking the autonomously moving robot 1 transmitted to the driving control means 4 from environmental information acquisition means 6, the driving control means 4 controls the driving means 5 to proceed the driving toward the destination T while performing the evading motion, as shown in FIG. 19A. To the contrary, stopping control is performed so as not to approach to a person M more than a distance D2 previously established, as shown in FIG. 19B. By these controls, it is possible to prevent to give a person a surprise by approaching the autonomously moving robot when the person does not awake it. It is judged whether a detected person awakes the autonomously moving robot or not by a method mention later.

Figure 20A:
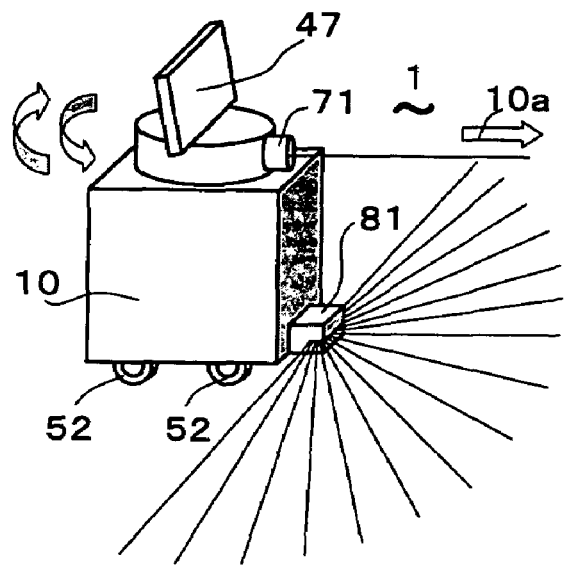
FIG. 20A and FIG. 20B are perspective views explaining attention attracting motion to a person in the above equipment.
Figure 20B:
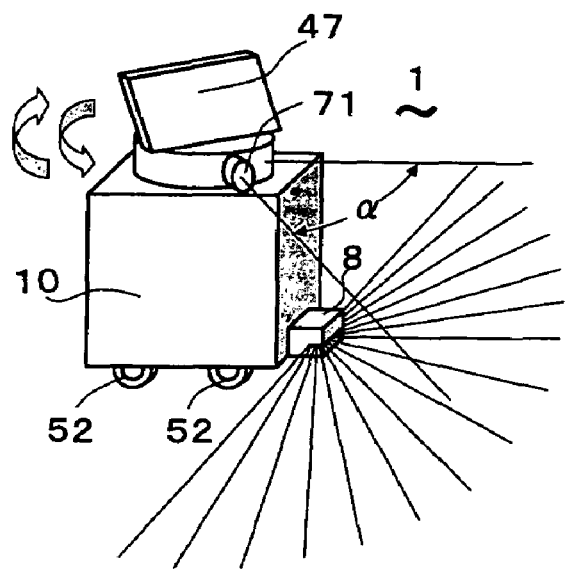

Still another corresponding method to a person detected is described. FIG. 20A and FIG. 20B show an attention attracting motion of the autonomously moving robot for a person. When the autonomously moving robot passes neighborhood of a detected person, it takes an action for the person. For example, when a monitor screen 47 is established on a rotation unit at upper portion of the main body 10 of the autonomously moving robot, the rotation unit is rotated depending on a direction angle α of the detected object recognized as a person transmitted from the environmental information acquisition means, so that the monitor screen 47 is turned to the direction. When an attention attraction display such as a picture imitated a face of a person is provided on the monitor screen 47, it is recognized that the autonomously moving robot 1 moves with recognizing a person by persons in circumference thereof. In addition, it is possible to output sound signal simultaneously to a person so as to attract his attention.

Since the moving control means 4 takes the attention attracting motion to a person when it passes the neighborhood of the detected person, it is possible to increase affinity to a person.

Still another corresponding method to a person detected is described. By storing image taken by the imaging means into the memory means, or transmitting the image to a remote station with using a communication means mounted on the autonomously moving robot with respect to a person detected, it is possible to give a surveillance function to the autonomously moving robot, so that it is applicable to security or crime prevention.

A relationship between coordinate systems when the laser-radar is used as the ranging apparatus is described. FIG. 21A and FIG. 21B each shows disposition of coordinates in the autonomously moving robot 1. A standard coordinate system XR-YR which is coordinates fixed to the autonomously moving robot 1 is a rectangular coordinate system, and a coordinate system XS-YS having an origin at the scanning center of the laser-radar 83 is also a rectangular coordinate system. XR-YR plane and XS-YS plane are in the same plane, and XR axis and XS axis are in the same direction, and YR axis and YS axis are out of only a distance dS. Position coordinates of an object O3 in the XS-YS plane in a position distant from a distance D3 from and direction angle β with respect to the scanning center of the laser-radar 83 become $XS = D3 \times \sin(\beta)$ and $YS = D3 \times \cos(\beta)$ in coordinate system XS-YS; and $XR = XS + dS$ $YR = YS$ in coordinate system XR-YR.

Figure 22:
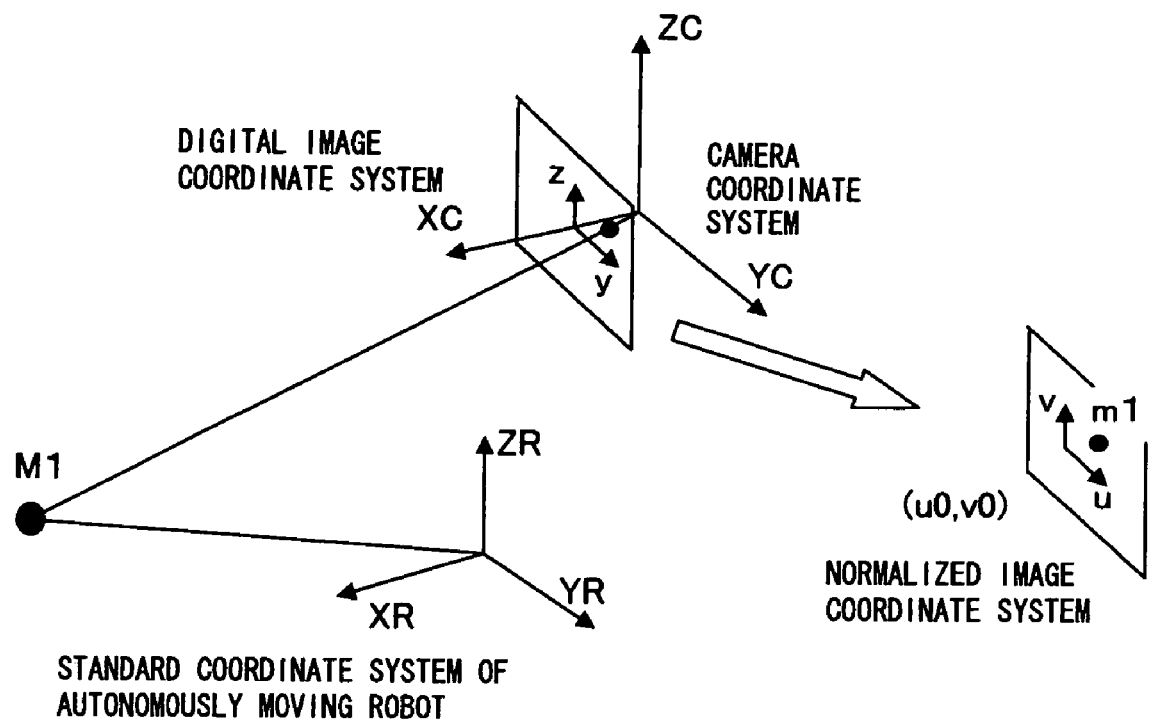
FIG. 22 is an explanation drawing of a relation between standard coordinate system of the autonomously moving robot and normalization pictorial image coordinate system in the above equipment.

A relation between normalized image coordinate system and a standard coordinates system of the autonomously moving robot is described. FIG. 22 shows a relation between the standard coordinates system of the autonomously moving robot 1 and the normalized image coordinate system. When a point M1 in a three-dimensional space obtained by the range information acquisition means is observed as a point m1 in a normalized image, an observation location is expressed in the standard coordinate system of the autonomously moving robot 1, a camera coordinate system, a digital image coordinate system, and a normalized image coordinate system. When the coordinate of the point M1 in the standard coordinates system of the autonomously moving robot 1 is designated as (XR, YR, ZR), and the coordinate of the point m1 in the normalized image coordinate system is designated as (u, v), the coordinate of the point m1 is calculated by the equation (8) from the coordinate of the point M1.

(Please apply the equation (8) cut from a copy of the International Publication)

With such a conversion, it is possible to project a measurement result of the laser-radar on an image. in the above-mentioned equation, a symbol S designates a constant, a symbol f designates a focal length, symbols ku and kv designate units on u axis and v axis when the normalized image coordinate system is used as a standard, symbols u0 and v0 designate coordinates of the origin of the normalized image coordinate system in the digital image coordinate system, a symbol θ designates an angle between the u axis and v axis, symbols r11 and so on designate rotation matrix between the standard coordinate system of the autonomously moving robot 1 and the camera coordinate system, and symbols t1, t2 and t3 designate translation matrix between the standard coordinate system of the autonomously moving robot 1 and the camera coordinate system. These parameters are previously demanded by performing camera calibration. Derivation of this equation (8) is basic, and, there is derivation example in, for example, "Computer Vision Technique Criticism and Future Outlook", (new technique communications), in Chapter 6 of epipola geometry in computer vision.

(Image Processing based on Laser-Radar Measurement Result)

An example for recognizing environment by performing a person recognition in the image information acquisition means 7 with reference to the measurement result of the ranging information acquisition means 8 is described. In this example, the laser radar 83 is used as the ranging apparatus 81 in the range information acquisition means 8. When the laser-radar 83 performs ranging and the range information analysis tool 82 detects an object having a width corresponding to a dimension of a person from the measured data, the object is regarded as a candidate of a person. The image information acquisition means 7 performs person recognition in an image corresponding to a position of the candidate of a person.

Figure 23:
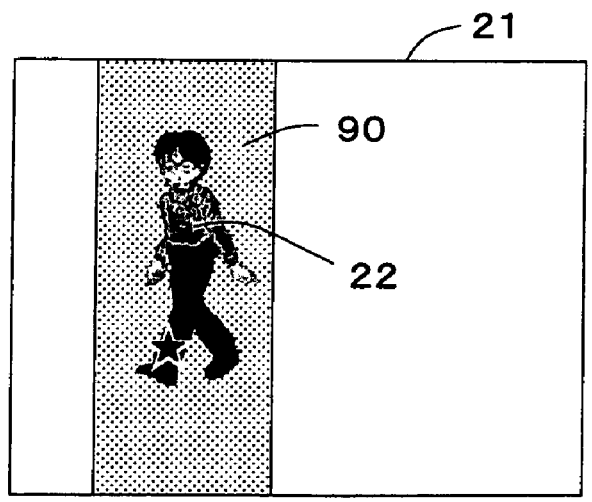
FIG. 23 is a drawing showing an image which is image processed with reference to a measurement result of the laser-radar in the above equipment.
Figure 24:
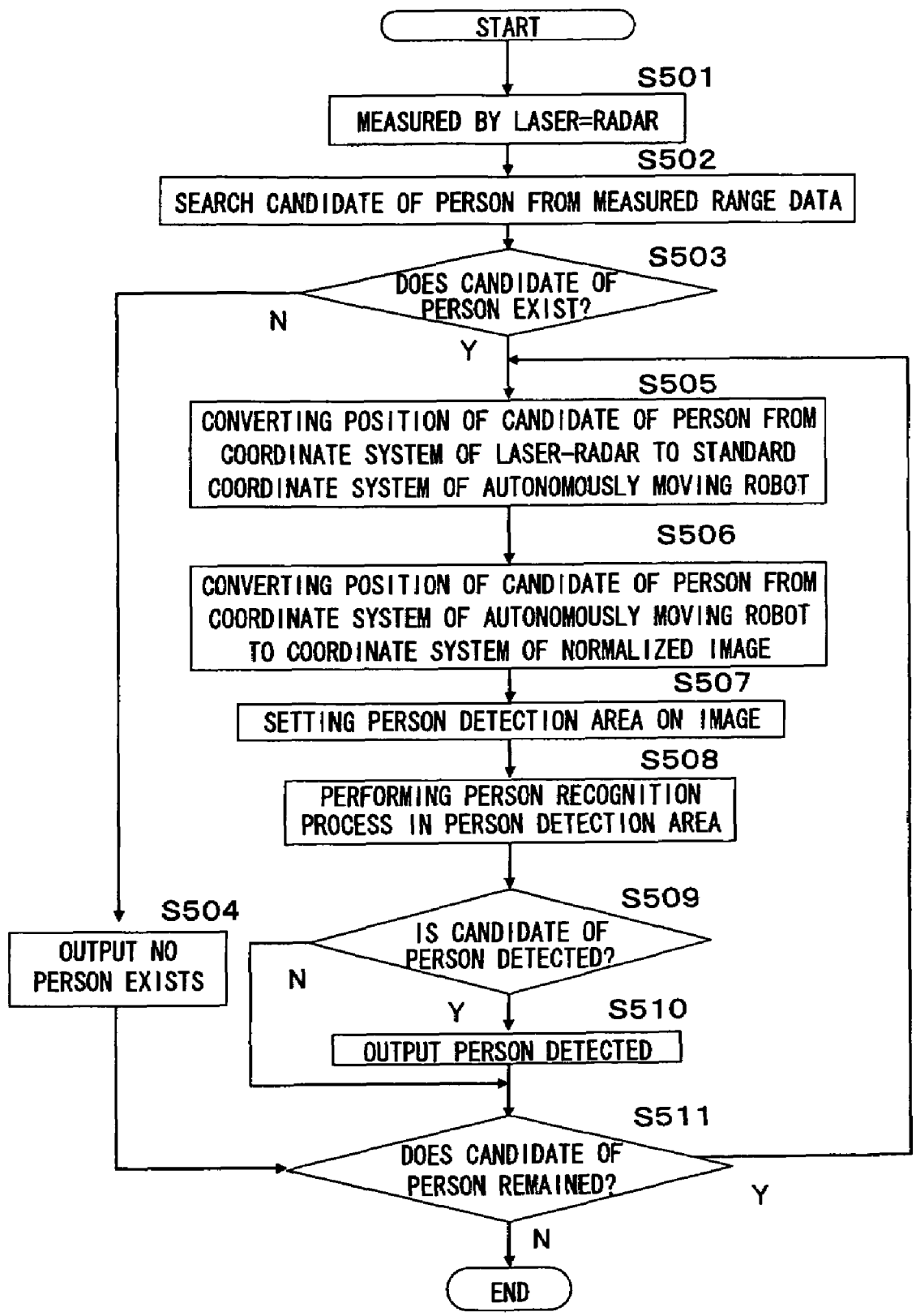
FIG. 24 is a flowchart of the image processing performed with reference to the measurement result of the laser-radar in the above equipment.

FIG. 23 shows an image which is recognition processed with reference to a measurement result of the laser-radar, and FIG. 24 shows a processing flow for performing the person recognition with reference to the measured result of the laser-radar. A range to an object is measured by the laser-radar (S501), and the range information analyzing means 82 searches for a candidate of a person from ranging data (S502). When no candidate of a person exists (N in S503), a result that no person exists is outputted to the environment recognition means 9 (S504), and when a person exists (Y in S503), the position is converted from the laser-radar coordinate system to the standard coordinate system of the autonomously moving robot (S505).

Subsequently, the position of the candidate of a person is converted from the standard coordinate system of the autonomously moving robot to the normalized image coordinate system using the above-mentioned equation (8) (S506), and a position on the normalized image coordinate system is provided. As shown in FIG. 23, a person detection area 90 previously decided corresponding to the dimension of a person that is the object to be detected is established in a periphery of a position 22 of the candidate of a person on an image 21 (S507). The environment recognition means 9 performs the person recognition process in the person detection area 90 (S508), judges that the candidate of a person detected by the laser-radar is a person when the candidate of a person is detected (S509), and outputs a signal that shows the detection result of the laser-radar was corrected to the driving control means 4 (S510). The above-mentioned processes are performed with respect to all candidates of a person (S511). In this way, by limiting the area where the person recognition process is performed by image processing on the basis of the measurement result of the laser-radar, it is possible to increase the efficiency of processing and reliability of the person detection.

(Measurement by Laser-Radar based on Result of Image Processing)

Figure 25A:
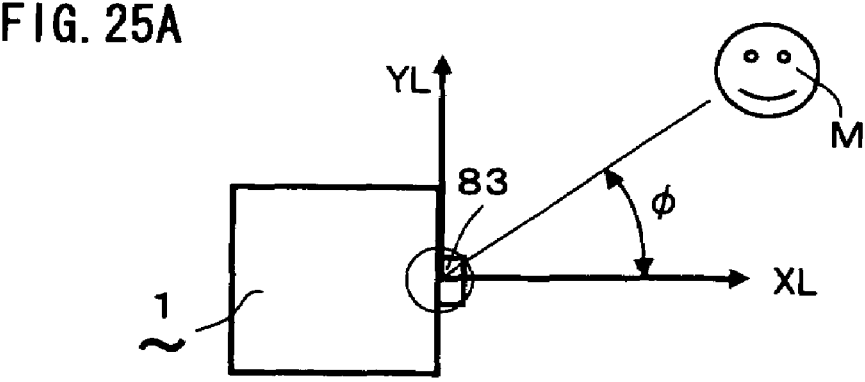
FIG. 25A is a plan view of an apparatus for measuring of the laser-radar with reference to a result of image processing in the above equipment.
Figure 25B:
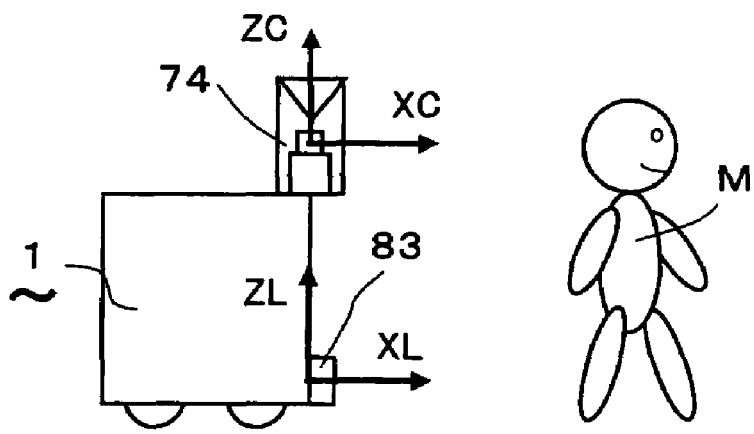
FIG. 25B is a side view thereof.
Figure 25C:
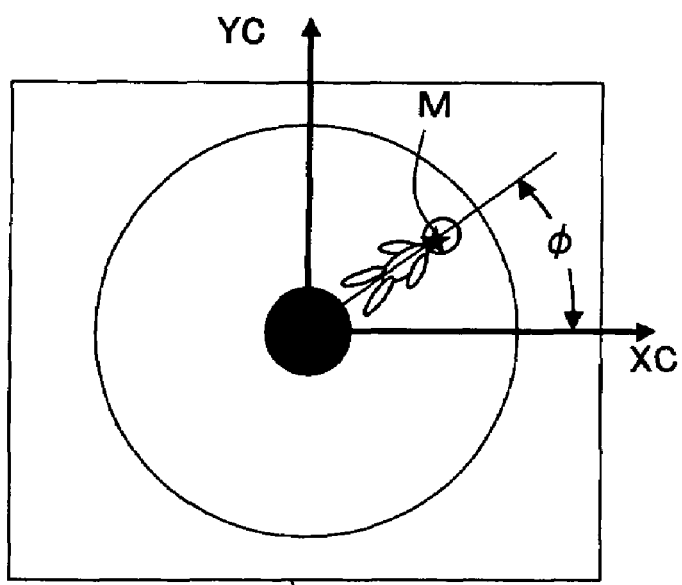
FIG. 25C is a drawing showing an image of a measurement result.
Figure 26:
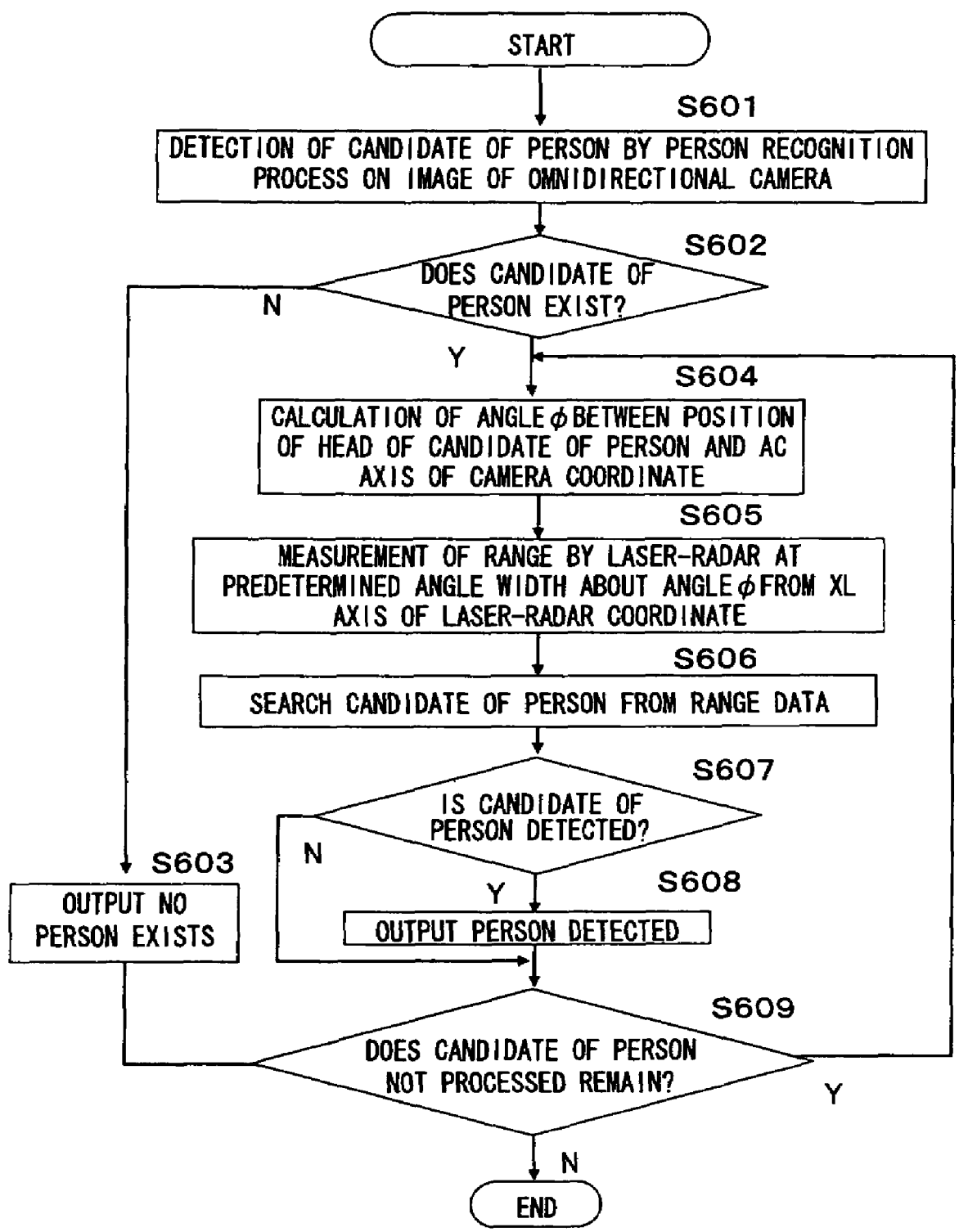
FIG. 26 is a flowchart of the measurement process of the laser-radar performed with reference to the result of image processing in the above equipment.

The following is a different example from the above, and an example that obtains range information of a candidate of a person in the range information acquisition means 8 and recognizes the environment with reference to the result of processing of the image information acquisition means 7 is described. FIG. 25A and FIG. 25B show measurement of the laser-radar based on the result of image processing, and FIG. 25C shows an image of the measurement result. FIG. 26 shows a process flow for detecting a person in the measurement of the laser-radar with reference to the result of the image processing. In this example, an omnidirectional camera 74 is used as the imaging apparatus 71 in the image information acquisition means 7, and the laser-radar 83 is used as the ranging apparatus 81 in the range information acquisition means 8. As illustrated in the figures, the directions of axes of the camera coordinate system XC-YC-ZC of the omnidirectional camera 74 are agreed with those of the coordinate system XL-YL-ZL of the laser-radar. The omnidirectional camera 74 is installed in a manner that the origin of the camera coordinate system is located to a position shifted above the ZL axis of the laser-radar coordinate system.

First, detection of a candidate of a person is performed by the image recognition attention means 72 with respect to omnidirectional image 19 taken by the omnidirectional camera 74 (S601). When no candidate of a person exists (N in S602), a result that no person exists is outputted to the environment recognition means 9 (S603), and when there is a candidate of a person exists (Y in S602), an angle φ between a direction of a head portion of the detected candidate of a person and the XC axis of the camera coordinate is calculated (S604). Subsequently, a circumference in the direction of the angle φ from the XL axis of the laser-radar coordinate is measured by the laser-radar 83 (S605). An object having a width corresponding to a dimension of a person is searched by the range information analyzing means 82 and the environment recognition means 9 (S606). When a candidate of a person is detected (Y in S607), a result that a person is detected is outputted to the driving control means 4 (S609). The above-mentioned processes are performed with respect to all candidates of a person obtained by processing the image (S609).

(Judging Process whether a Person awakes the Autonomously Moving Robot or not)

Figure 27A:
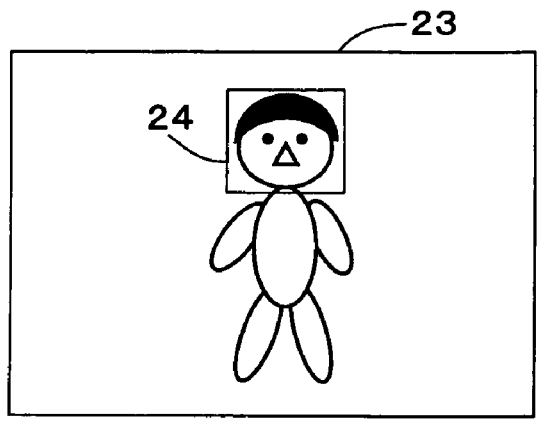
FIG. 27A is a drawing showing an image for judging that a person awakes the equipment in the above equipment.
Figure 27B:
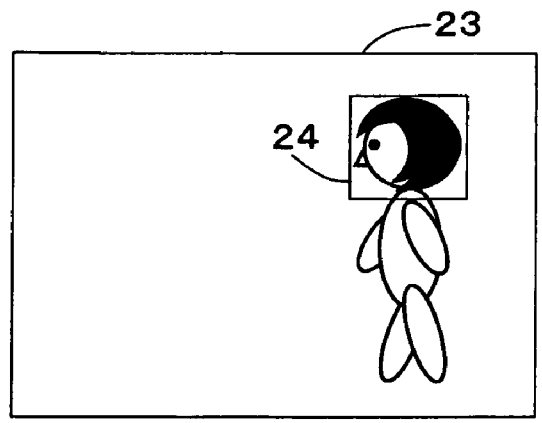
FIG. 27B is a drawing showing an image that a person does not awake the equipment.
Figure 28:
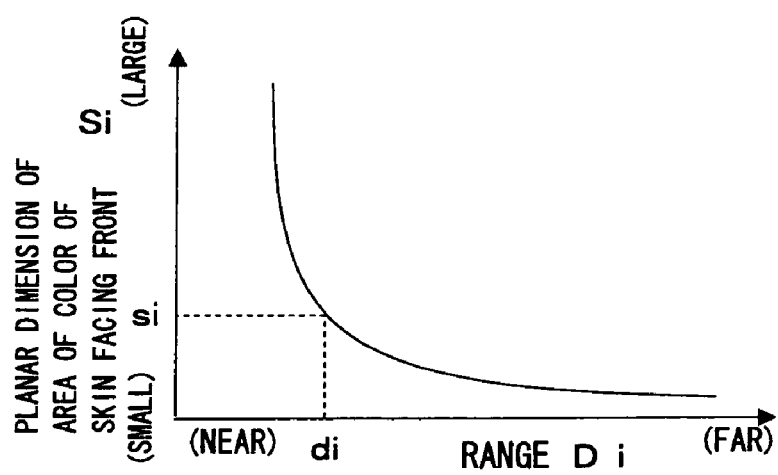
FIG. 28 is a drawing showing a graph of a relation between a range to a person and a skin colored planar dimension of a face used in the above equipment.

A method for judging whether a person awakes the autonomously moving robot or not is described. FIG. 27A shows an image that a person awakes the equipment, and FIG. 27B shows an image that he does not awake it, and FIG. 28 shows a graph of a relation between a range to a person and a planar dimension of an area of a color of skin. After performing the person recognition in the image recognition attention means 72 on the basis of the information of the range information acquisition means 8, the judgment whether the person awakes the autonomously moving robot 1 or not is performed by the image recognition attention means 72. The image recognition attention means 72 includes at least a detection unit for detecting an area of a color of skin from a photographed image, and a shape characteristic processing unit for arithmetically processing the shape of the detected area of the color of skin. The image recognition attention means 72 recognizes the area of the color of skin as a candidate of a person when the detected area of the color of skin satisfies a shape characteristic condition previously decided.

Then, awaking degree is judged that the awaking degree is higher when the person faces the front of the autonomously moving robot, and the awaking degree is lower when he turns away. In addition, a degree of facing the autonomously moving robot is judged depending on the planar dimension of the area of the color of skin in the head portion. As shown in FIG. 27, the planar dimension of the area of the color of skin generally becomes larger as the person faces the front. In addition, the dimension of the head portion can be assumed as constant without depending on individual difference. Therefore, as shown in FIG. 28, a planar dimension Si of an area of the color of skin of a reference face facing the front can be expressed as a function of a range Di from the autonomously moving robot to the person. The relation between the range Di from the autonomously moving robot to a person and the planar dimension Si of an area of the color of skin of a face can be demanded by experiment, previously.

Figure 29:
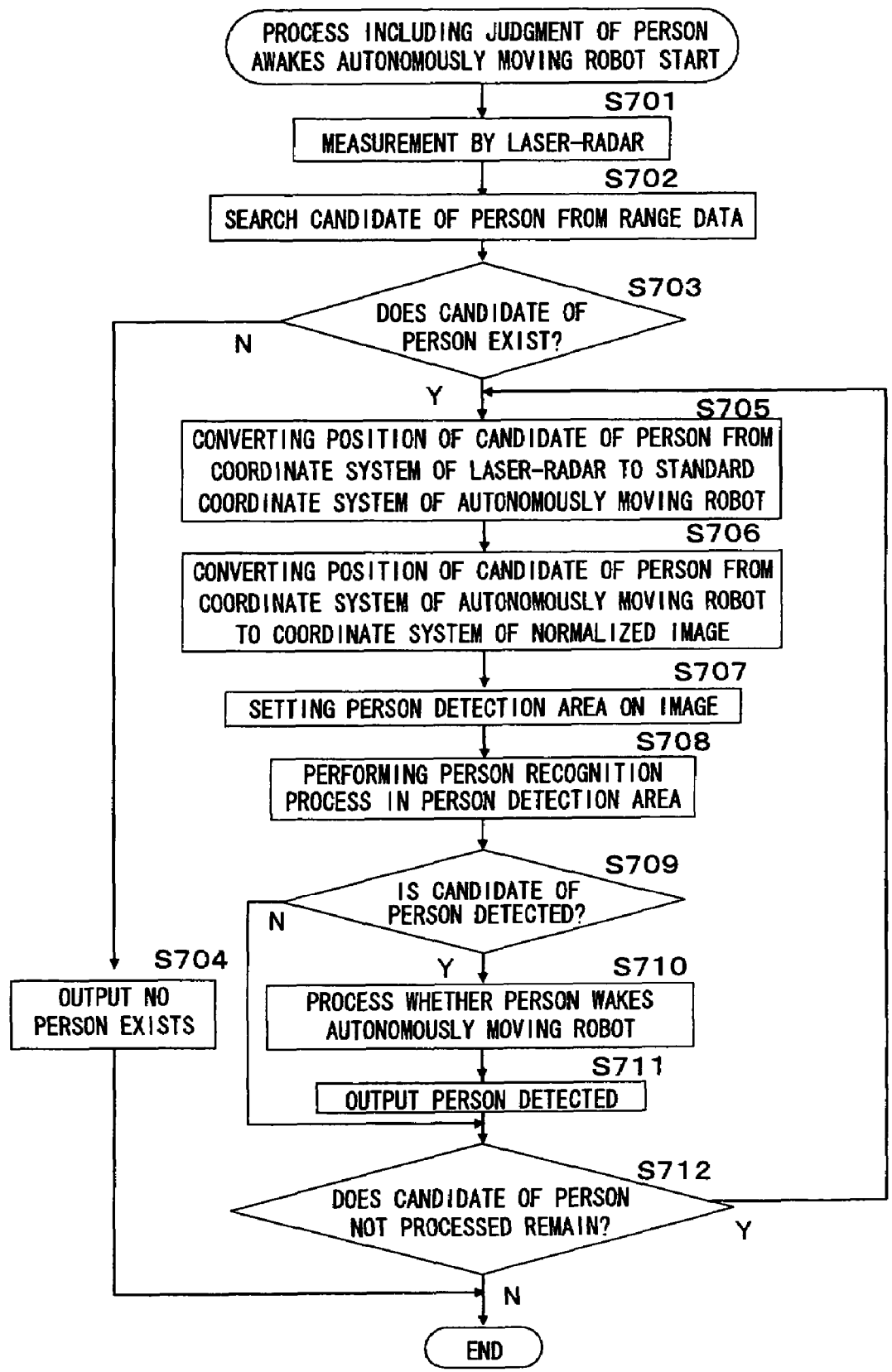
FIG. 29 is a flowchart of the person detection process in the above equipment.
Figure 30:
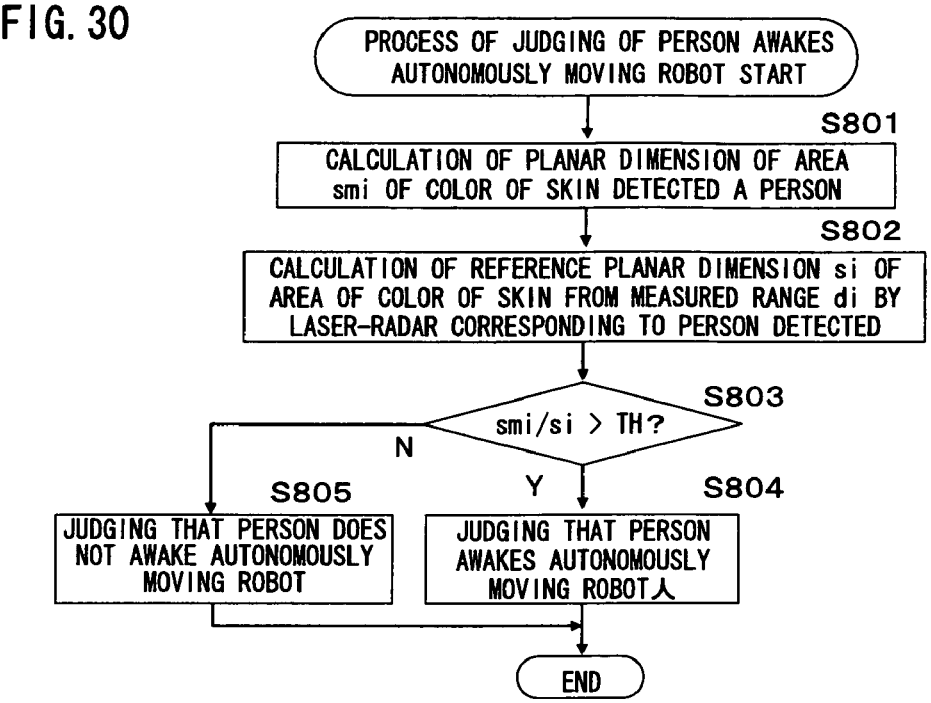
FIG. 30 is a flowchart of judging process whether a person awakes the equipment or not in the above equipment.

A processing flow including the judgment process whether a person awakes the autonomously moving robot or not is described. FIG. 29 shows a flow for processing the person detection. In this example, the laser radar 83 is used as the ranging apparatus 81 of the range information acquisition means 8, and the stationary camera 70 is used as the imaging apparatus 71 of the image information acquisition means 7. Steps S701 to S709 in this processing flow are the same as the steps S501 to S509 of the image processing flow by the measurement result of the laser-radar in FIG. 24 mentioned above, so that description of them is omitted. When a candidate of a person is detected in step S709 (Y in S509) (SIC), a processing whether the detected person awakes the autonomously moving robot or not is performed (S710). After that, it is judged whether the person awakes the autonomously moving robot or not with respect to the output of the person detection, and a property showing the result of judgment and the result of judgment that the candidate of a person detected by the laser-radar is a person are outputted to the environment recognition means 9 (S711). The above-mentioned processes are performed with respect to all candidates of a person (S712). Elaboration of the judgment process whether the detected person awakes the autonomously moving robot or not in the above-mentioned step S710 is described. FIG. 30 shows a flow of judgment process whether person awakes the autonomously moving robot or not. In the image recognition attention means 72, a planar dimension smi of the area of the color of skin 24 from which a person is detected is measured by, for example, a number of pixels (S801). Subsequently, a reference planar dimension of an area of the color of skin si is demanded with using a range di to a person measured by the laser-radar and a relation between a range from the autonomously moving robot to a person and a planar dimension of a face of the person who faces the front (FIG. 28) (S802). Subsequently, a ratio smi/si of the planar dimension smi of the area of the color of skin against the reference planar dimension si of the area of the color of skin is calculated, and the ratio is compared with a threshold value TH previously decided (S803). When smi/si>TH as a result of comparison (Y in S803), it is judged that the person awakes the autonomously moving robot (S804). When smi/si<TH (N in S803), it is judged that the person does not awake the autonomously moving robot (S805).

Figure 31A:
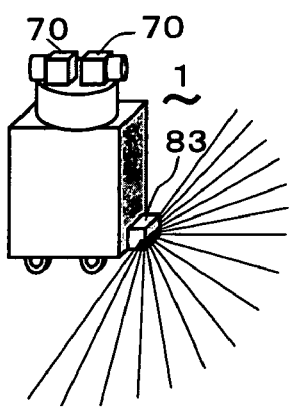
FIG. 31A, FIG. 31B, and FIG. 31C are perspective views explaining combinations of imaging apparatus and ranging apparatus.
Figure 31B:
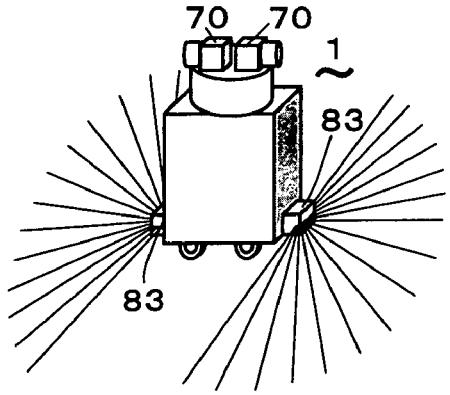
Figure 31C:
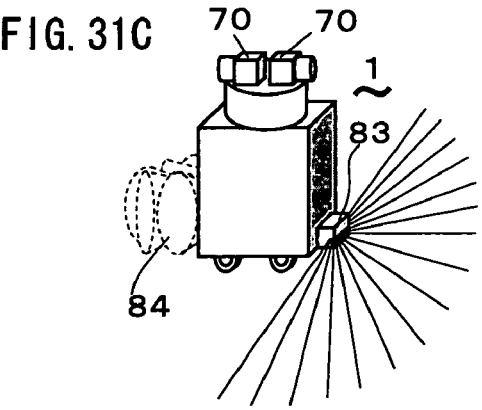

In addition, the present invention is not limited to the above-mentioned configuration and various kinds of transformation is possible. For example, as shown in FIG. 31A, FIG. 31B, and FIG. 31C, it is possible to combine the imaging apparatuses and the ranging apparatuses. The autonomously moving robot 1 of FIG. 31A comprises one laser-radar 83 and two cameras 70 on a rotation mechanism 70a. The autonomously moving robot 1 of FIG. 31B comprises two laser-radars 83 and two cameras 70 on a rotation mechanism 70a. The autonomously moving robot 1 of FIG. 31C comprises one laser-radar 83, one set of ultrasonic sensors 84 and two camera 70 on a rotation mechanism 70a.

Besides, this application is claimed a priority based on Japanese patent application dated Mar. 14, 2003. Entirety of description of the application is incorporated in this application by cross-reference.

The invention claimed is:

1. An autonomously moving robot that drives while evading obstacles, comprising:
   a memory to memorize map information of a driving domain and various parameters for driving;
   an input instruction receiver to input a destination and a command for moving;
   a route determiner to form a driving route to the destination;
   an environmental information acquisitioner to acquire environmental information on the driving route including an object becoming an obstacle;
   a driver to drive the autonomously moving robot;
   a self-location recognition sensor to recognize a self-location on a basis of information provided by the environmental information acquisitioner and the map information; and
   a driving controller to control the driver to arrive at the destination while evading obstacles and recognizing the self-location, wherein the environmental information acquisitioner further comprises:
   an imaging apparatus that takes an environmental image on the driving route;
   an image recognition processor to extract an edge image from the taken environmental image, and to evaluate a degree of circularity of the edge image by arithmetically processing the shape of the edge image, and if the evaluated degree of circularity is larger than a predetermined threshold value, the image recognition processor extracts an area including the evaluated edge image from the environmental image as a candidate region including a human head;
   a ranging apparatus to detect an object existing in an environment on the driving route, and to measure a distance range and an orientation of the object;
   a range information analyzer to arithmetically process the measured distance range and the orientation of the object to obtain a width of the object related to an angle region where collected data of the measured distance range and the orientation is generally constant, wherein the object is recognized based on the obtained width being within predetermined values; and
   an environment recognizer to perform recognition processing by comparing information based on an orientation in actual space of the candidate region including the human head extracted by the image recognition processor with information based on an orientation of the object having the width that is within the predetermined values recognized by the range information analyzer, and wherein when the compared information is consistent with one another, the environment recognizer outputs the information of the distance range and the orientation of the object as an environmental information on a person on the driving route to the driving controller.

2. The autonomously moving robot described in claim 1, wherein the image recognition processor arithmetically processes an image data with respect to the orientation of the object obtained by the range information analyzer, and the environment recognizer performs recognition processes with respect to a portion of the image data corresponding to the orientation of the object.

3. The autonomously moving robot described in claim 1, wherein the ranging apparatus performs ranging with respect to an area extracted by the image recognition processor, and the environment recognizer performs recognition processing with respect to a portion corresponding to the orientation of the extracted area.

4. The autonomously moving robot described in claim 1, wherein the ranging apparatus is comprised of a laser-radar which measures a range to an obstacle by scanning a plane parallel to a driving road surface at a previously set angle.

5. The autonomously moving robot described in claim 1, wherein the range information analyzer recognizes an object as a candidate of a person when a width of the object obtained by arithmetically processing the range data is in a previously established region.

6. The autonomously moving robot described in claim 1, wherein the range information analyzing means recognizes an object as a candidate of a person when a measured distance range to the object is not coincided with a distance range to an object on a memorized map.

7. The autonomously moving robot described in claim 1, wherein the imaging apparatus is a camera mounted on the autonomously moving robot, and coordinates of an image taken by the camera can be converted to a standard coordinates system of the autonomously moving robot.

8. The autonomously moving robot described in claim 1, wherein the image recognition processor includes at least a specific color area detecting unit to detect a specific color area from a photographed image data and a shape characteristic processing unit to arithmetically process a shape of the specific color area detected by the specific color area detecting unit, and recognizes the specific color area as a candidate of a person when the detected specific color area satisfies predetermined shape characteristic conditions.

9. The autonomously moving robot described in claim 1, wherein the environment recognizer calculates a ratio of a planar dimension of an area of a color of human skin detected in the image with respect to a planar dimension of an area of a color of human skin at a range previously established from the autonomously moving robot to a person, and judges whether the detected person awakes the autonomously moving robot or not by comparing the ratio with a threshold value previously established.

10. The autonomously moving robot described in claim 1, wherein the driving controller controls the driver to stop when an object recognized as a person exists in a moving direction of the autonomously moving robot and within a range previously established, to evade an obstacle if the obstacle exists, and to proceed the driving if no obstacle exists when the object recognized as a person does not exist in the moving direction of the autonomously moving robot.

11. The autonomously moving robot described in claim 1, wherein the driving controller controls the driver to evade an object recognized as a person based on a predetermined range when the object recognized as a person exists in a moving direction of the autonomously moving robot.

12. The autonomously moving robot described in claim 1, wherein the driving control means controls the driving means in a moving speed corresponding to a range or a range and an angle when the object recognized as a person exists in a range previously established.

13. The autonomously moving robot described in claim 9, wherein the driving controller controls the driver to approach the object recognized as the person when it is possible to judge that the person detected activates the autonomously moving robot, and not to approach to the person detected more than the range previously established.

14. The autonomously moving robot described in claim 1, wherein the driving controller takes an attention attracting action to a person when the autonomously moving robot passes near the person detected.

15. The autonomously moving robot described in claim 1, wherein the image information acquisition means acquisitioner (SIC) photographs a person detected and memorizes its image in the memory.

16. The autonomously moving robot described in claim 1, wherein the image information acquisitioner (SIC) photographs a person detected and transmits the image to a remote station.

\* \* \* \* \*